May 17, 1955 H. H. ORR 2,708,392
APPARATUS FOR INCORPORATING SLEEVED VALVES IN BAGS
Filed July 14, 1952 13 Sheets-Sheet 1

INVENTOR
Howard H. Orr
BY Mason, Fenwick & Lawrence
ATTORNEYS

May 17, 1955  H. H. ORR  2,708,392
APPARATUS FOR INCORPORATING SLEEVED VALVES IN BAGS
Filed July 14, 1952  13 Sheets-Sheet 4

INVENTOR
Howard H. Orr
BY Mason, Fenwick & Lawrence
ATTORNEYS

May 17, 1955     H. H. ORR     2,708,392
APPARATUS FOR INCORPORATING SLEEVED VALVES IN BAGS
Filed July 14, 1952     13 Sheets-Sheet 6

INVENTOR
Howard H. Orr
BY Mason, Fenwick & Lawrence
ATTORNEYS

May 17, 1955 H. H. ORR 2,708,392
APPARATUS FOR INCORPORATING SLEEVED VALVES IN BAGS
Filed July 14, 1952 13 Sheets-Sheet 7

INVENTOR
Howard H. Orr
BY Mason, Fenwick & Lawrence
ATTORNEYS

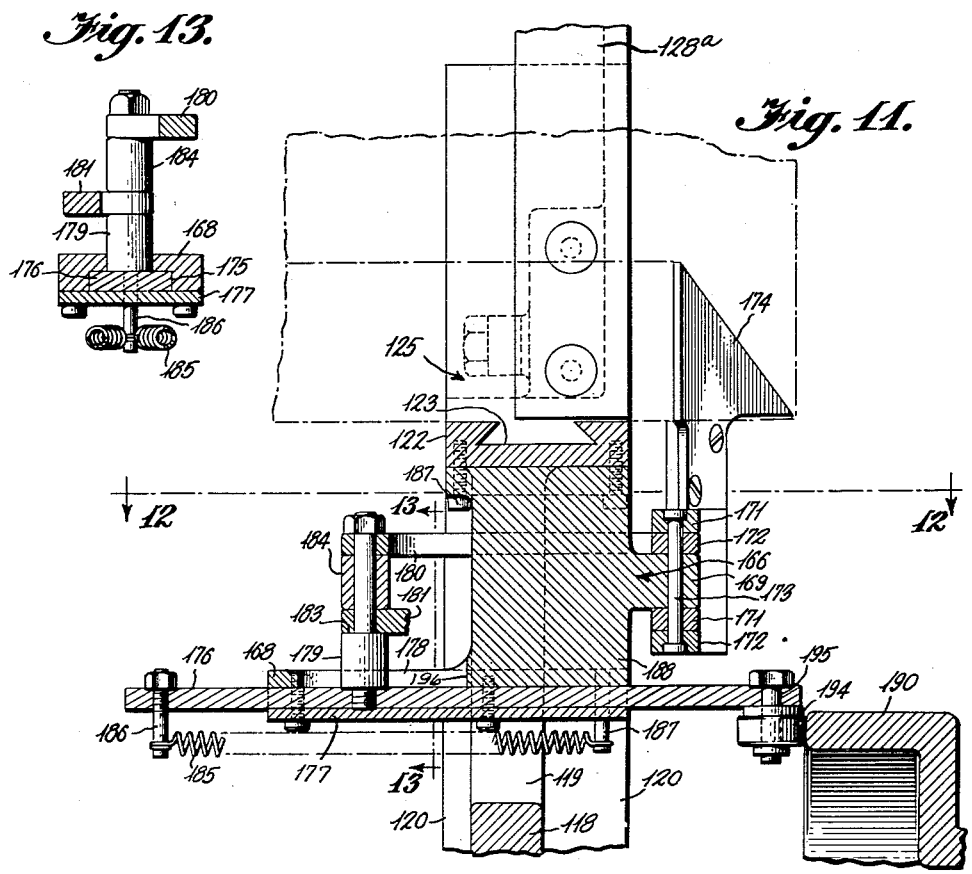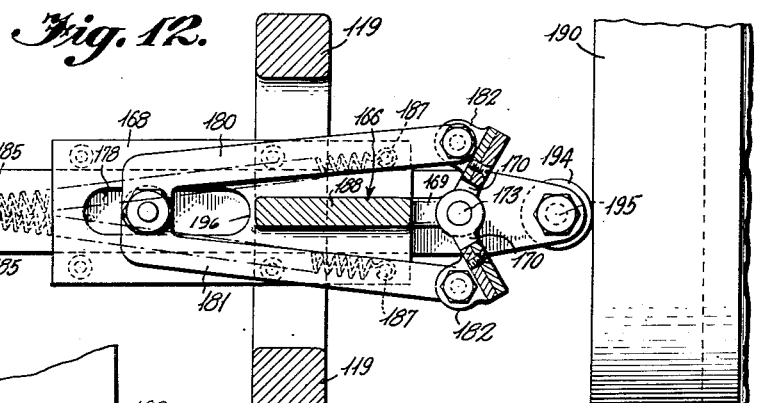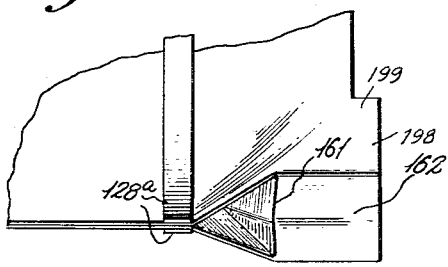

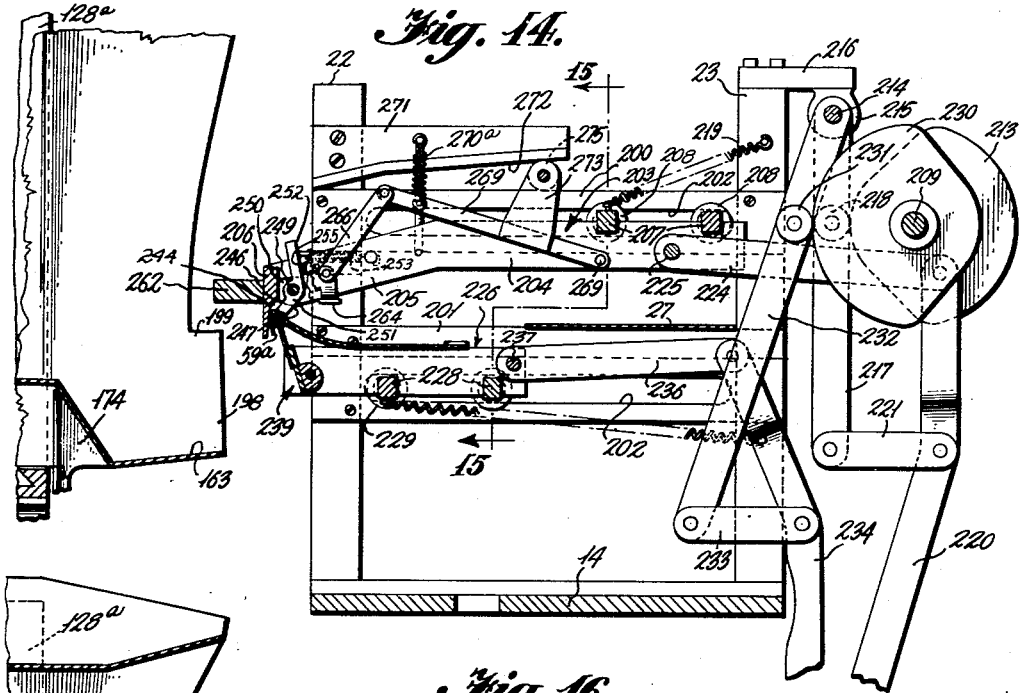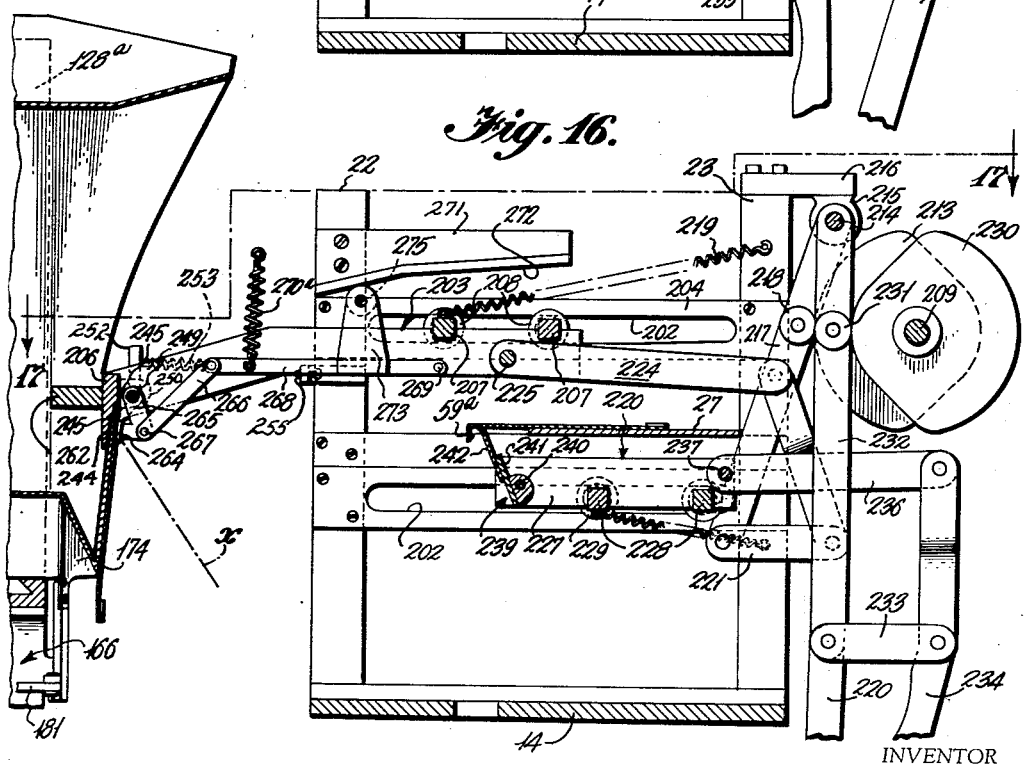

May 17, 1955

H. H. ORR 2,708,392

APPARATUS FOR INCORPORATING SLEEVED VALVES IN BAGS

Filed July 14, 1952

INVENTOR
Howard H. Orr

BY Mason, Fenwick & Lawrence
ATTORNEYS

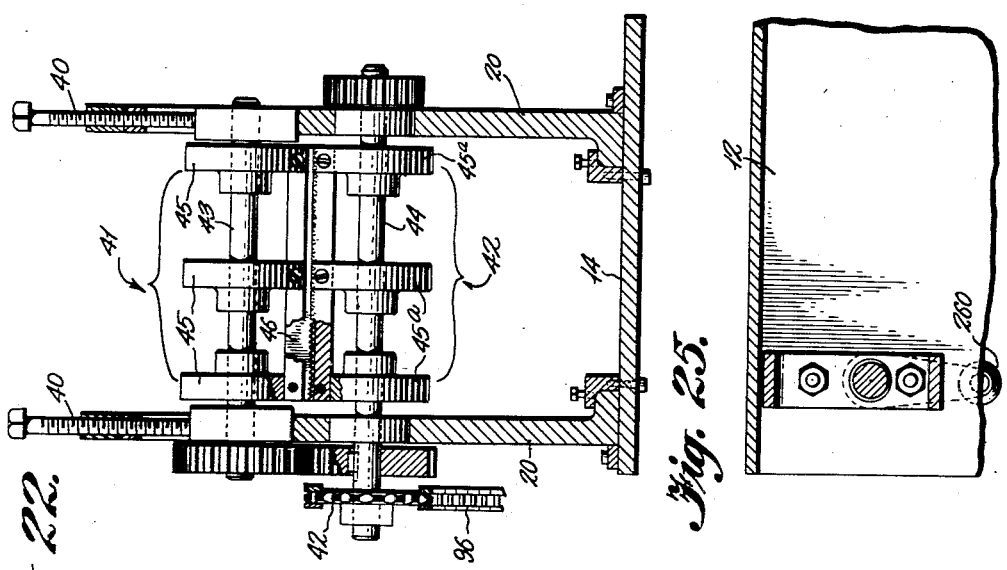
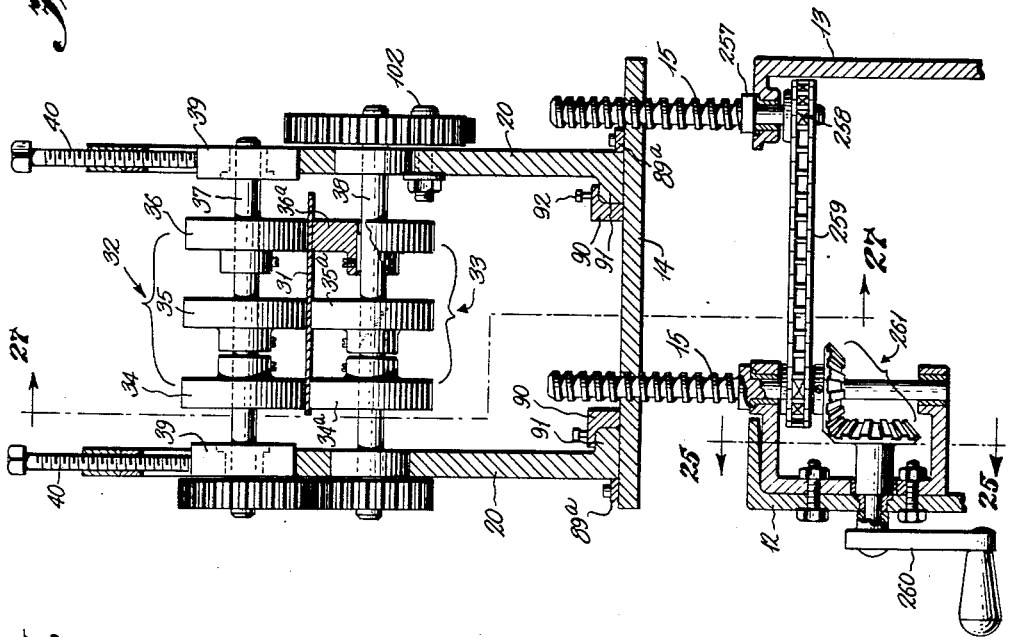

May 17, 1955  H. H. ORR  2,708,392
APPARATUS FOR INCORPORATING SLEEVED VALVES IN BAGS
Filed July 14, 1952  13 Sheets-Sheet 12
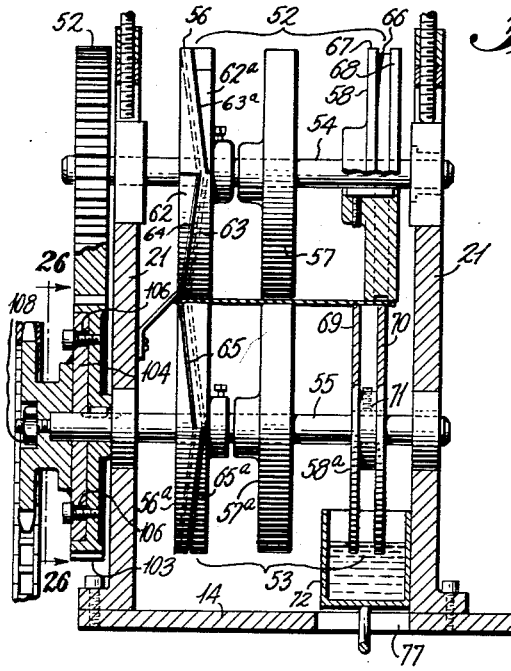
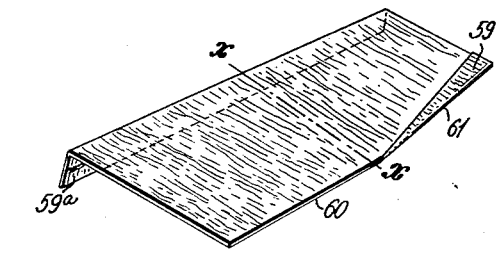
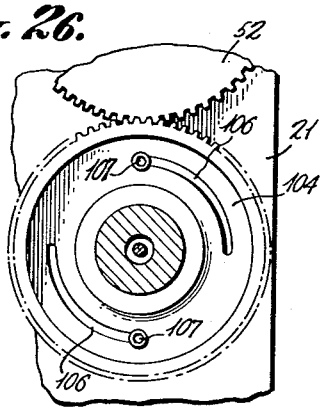
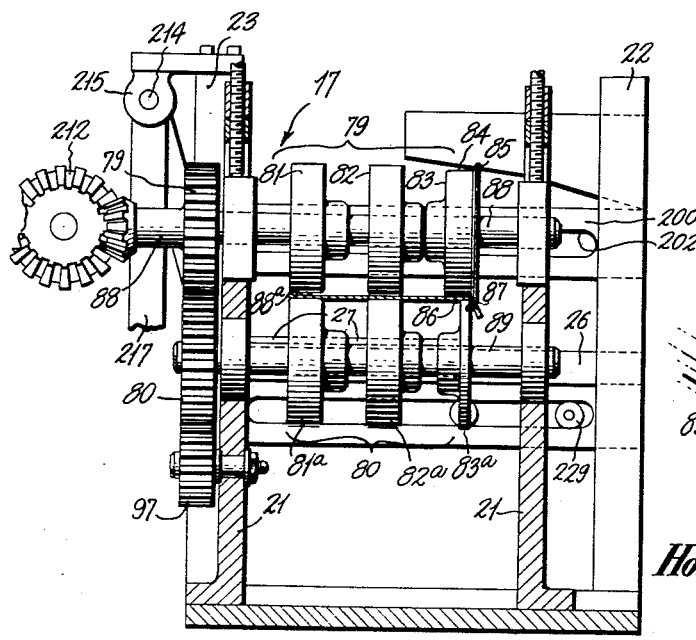
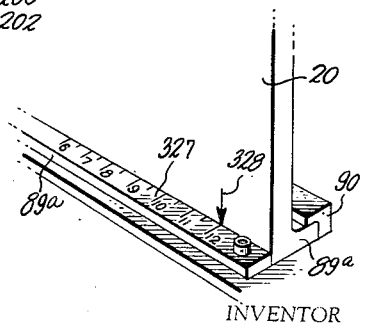
INVENTOR
Howard H. Orr
BY Mason, Fenwick & Lawrence
ATTORNEYS May 17, 1955  H. H. ORR  2,708,392
APPARATUS FOR INCORPORATING SLEEVED VALVES IN BAGS
Filed July 14, 1952  13 Sheets-Sheet 13

INVENTOR
Howard H. Orr
BY Mason, Fenwick & Lawrence
ATTORNEYS

United States Patent Office 2,708,392
Patented May 17, 1955

2,708,392

APPARATUS FOR INCORPORATING SLEEVED VALVES IN BAGS

Howard H. Orr, New Orleans, La., assignor to Orr Manufacturing Company, Inc., a corporation of Louisiana Application July 14, 1952, Serial No. 298,748

12 Claims. (Cl. 93—8)

This invention relates to a machine for incorporating sleeved valves in bags.

The functions and mode of operation of the machine may be best understood in the light of familiarity with the construction of the type of bag referred to. This is a paper bag of large size for bulk pulverulent or granular material, usually of multi-wall construction. It is a flat tube having longitudinal infolds or gussets at its opposite sides and stitched closed along its bottom edge. The top of the bag adjacent one corner is cut to form a rectangular marginal prolongation extending an inch or so beyond the rest of the top edge of the bag, the length of which prolongation determines the depth of the desired valve. The valve is conventionally formed by infolding this corner of the bag until the edge of the prolongation is perpendicular to the edge of the mouth of the bag, the inturned portion defining a dihedral fold extending within the bag, with congruent sides, said dihedral fold extending in an outward direction into the trough of the gusset.

The sleeve is a separate generally rectangular sheet of paper folded upon itself substantially congruently and arranged within the valve with its folded edge adjacent the apex of the valve, its opposite free edges in line with the top edge of the bag, its inner end having an outwardly overfolded flange embracing the free edge portions of the sides of the valve and pasted to the under surface thereof, and its outer end projecting laterally beyond the gusset.

In the finished bag, before filling the top of the bag and the top of the valve and valve sleeve are closed by a line of stitching. The bag is filled through the sleeve, the latter acting as a spout. After filling, the projecting end of the sleeve is tucked into the valve to close the valve.

The bag comes to the present machine in flat tubular form with the gussets flat folded and the rectangular prolongation projecting from its upper end. There is no precreasing excepting the lines of fold which determine the gusset. The sleeve comes to the machine in the form of a continuous roll of paper the width of the sleeve blank. It is the function of the machine to cut the blank from the roll, give the necessary conformation to the blank, apply paste thereto, open the mouth of the bag to condition the prolongation to receive the sleeve, to bring the sleeve blank into contiguity with the prolongation, to press it into adhesion with the prolongation, and thereafter, simultaneously to infold the corner of the bag bounded by said prolongation, and the sleeve blank to form the sleeved valve.

Another object of the invention is to provide a machine comprising a combination of four units, one being a blank forming sequence of mechanism which cuts sleeve blanks successively from a roll of blank material, overfolds a narrow triangular ear along one end edge of the blank adjacent one corner, provides two spaced lines of paste parallel to the opposite end edge on the under side of the blank adjacent to but spaced from said opposite end edge, folds down a flange from said opposite edge on a line intermediate the lines of paste, parallel thereto, and deposits said blank on a platform with said flange and paste lines overhanging an edge of the platform, another unit being an indexing drum facing the platform with its axis perpendicular to the flanged edge of the blank on said platform, said indexing drum having spaced pairs of clamping arms in radial planes equally angularly displaced about the axis of said drum, each spaced pair of arms being adapted to receive and hold a flat bag with its top end adjacent said platform and the corner which is to be infolded, to form the valve adjacent the axis of the drum, said pairs of arms respectively engaging the bag near the bottom and in a zone immediately to the rear of the part which is to be infolded, said drum having a step by step movement timed to stop said drum at forty-five degree intervals, at one of which the bag is held vertical before said platform, and having gusset spreading means associated with the forward pair of arms normally lying within the flat folded gusset, but which expands to spread the gusset while the bag is approaching vertical position, to open the lower end of the mouth of the bag; the third or transfer unit being an intermediary between the sleeve forming unit and indexing unit, which grips the sleeve blank on the platform close to the apex of its line of fold, introduces a spreading means into the mouth of the bag immediately above the area to be infolded, spreads the free edges of the prolongation into rectilinear relationship, moves the sleeve blank to a position in which its flanged portion overfolds the free edge of the prolongation, with a paste line on each side, presses the overfolded portion against the prolongation from both sides to secure adhesion of the paste lines with said prolongation; the fourth or creasing unit cooperating with said indexing drum at a station forty-five degrees beyond the vertical station, which simultaneously infolds the corner of the bag and creases the sleeve blank downwardly in the middle, in situ, in the valve thus formed.

Other objects of the invention will appear as the following description of a practical embodiment thereof proceeds.

In the drawings throughout the figures of which the same reference characters have been used to denote identical parts:

Figure 11 is a section taken along the line 11—11 of Figure 6;

Figure 12 is a section taken along the line 12—12 of Figure 11;

Figure 13 is a section taken along the line 13—13 of Figure 11;

Figure 14 is a section taken along the line 14—14 of Figure 1, showing the reciprocating carriage in cooperative initial transfer position;

Figure 16 is a view similar to Figure 14, showing the reciprocating carriages in cooperative final transfer position;

Figure 18 is a section taken along the line 18—18 of Figure 3;

Figure 19 is a section taken along the line 19—19 of of Figure 18;

Figure 20 is a section taken along the line 20—20 of Figure 19;

Figure 21 is a vertical section taken along the line 21—21 of Figure 1;

Figure 22 is a vertical section taken along the line 22—22 of Figure 1;

Figure 23 is a vertical section taken along the line 23—23 of Figure 1;

Figure 24 is a vertical section taken along the line 24—24 of Figure 1;

Figure 25 is a section taken along the line 25—25 of Figure 21;

Figure 26 is a section taken along the line 26—26 of Figure 23;

Figure 27 is a vertical longitudinal section taken along the line 27—27 of Figure 21;

Figure 28 is a perspective view of the formed sleeve blank with the lines of paste;

Figure 29 is a fragmentary detail in perspective showing adjusting means and a scale for adjustably varying the position of the severing knife for varying the length of the cut sleeve blanks;

Figure 30 is a fragmentary perspective view of a conventional bag, the gusset being spread and the adjacent portion of the mouth being opened incident to the spreading operation.

Figure 1:
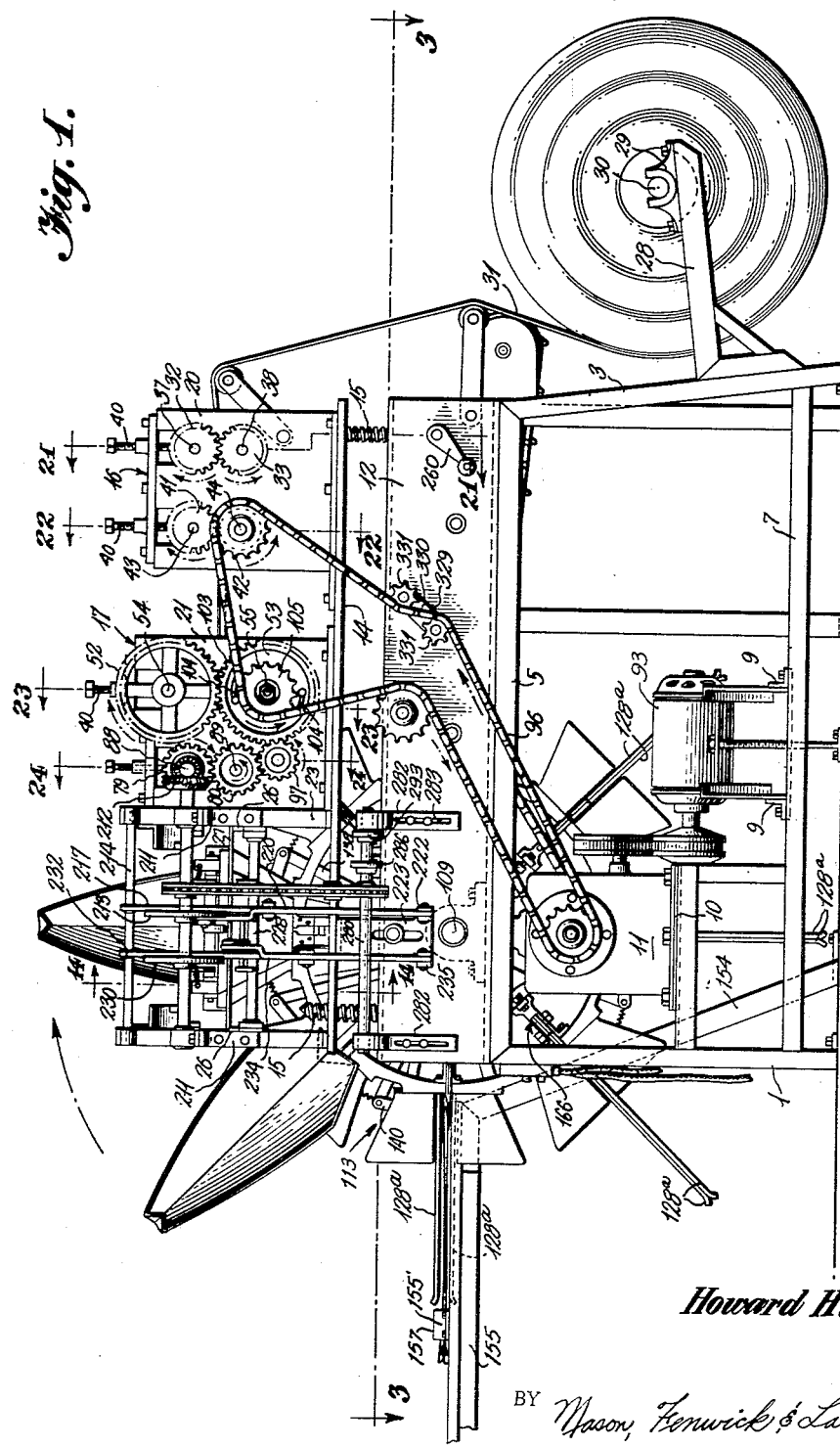
Figure 1 is a side elevation of a machine for incorporating sleeved valves in bags, embodying the principles of the present invention.

Referring now to the detailed construction of the machine as illustrated, the general framework which appertains to the sleeve blank forming mechanism will first be described. Adverting particularly to Figures 1, 2 and 4, the main frame consists of opposite spaced similar vertical sides comprising vertical legs 1 and 2 at the posterior end, forwardly inclined legs 3 and 4 at the anterior end, longitudinal members 5 and 6 bridging the tops of the legs, and longitudinal tie bars 7 and 8 between the legs near the bottom.

There are sufficient cross braces between the sides to give rigidity to the main frame, for instance, the angle bars 9 for the motor base, the plate 10 on which the reduction gear box 11 rests, and other parts of the super structure later to be described.

A pair of deep channel beams 12 and 13 rests upon the members 5 and 6 with their channels facing inwardly. Above the channel beams 12 and 13 is a horizontal bed plate 14 mounted upon jack screws 15 at its corners by means of which its level may be adjusted for a purpose to be described further on. The bed plate 14, as shown, is congruent with the outer edges of the beams 12 and 13.

A pair of roll supporting frames 16 and 17 are mounted upon the bed plate 14 in longitudinal order and spaced apart, each comprising oppositely spaced vertical face plates 20 and 21 secured to the bed plate 14, in which are journaled certain pairs of rolls concerned with the formation of the sleeve blank. Adjacent the posterior end of the roll supporting frame 17 are two longitudinally spaced pairs of transversely aligned posts 22, 23, 24 and 25 (see Figure 17) forming components of a frame yet to be described, but for the present purpose it is sufficient to state that the posts of each pair are bridged by cross pieces 26 at common level which support a horizontal platform 27.

A pair of similarly positioned brackets 28 extend forwardly from the inclined legs 3 and 4 of the main frame on which open topped bearings 29 are mounted for receiving the shaft 30 of a roll of a continuous wound strip of paper 31 the width of a sleeve blank.

The structure and mode of operation of the sleeve blank forming unit will now be described. The roll supporting frame 16 carries a forward pair of upper and lower driven feed rolls 32 and 33, between which the strip 31 is conveyed, each roll consisting of three spaced disks, respectively, 34, 35 and 36 and 34a, 35a and 36a, mounted for longitudinal adjustment on the respective shafts 37 and 38, corresponding upper and lower disks being in registry. The upper shaft 37 is journaled in blocks 39, vertically slidable in recesses in the face plates 20 and engaged by adjusting studs 40 so that the pressure upon the intervening strip can be regulated. The disks are made longitudinally adjustable to suit strips 31 of different width, since for different bags the valve sleeve may be of different depth. It is to be noted in Figure 21 that strip 31 projects farther beyond the righthand disk than the opposite side of said strip projects beyond the lefthand disk. This wider projecting margin will become the downturned flange 59a of the sleeve blank shown in Figure 28.

The roll supporting frame 16 carries another pair of upper and lower driven rolls 41 and 42 on respective shafts 43 and 44 (see Figure 22). These rolls constitute the severing station. Each consists respectively of spaced disks 45 and 45a, corresponding disks being in registry. These disks are out of contact so that the paper can freely slip through except at the moment of severance of the blank from the strip. The lower disks support the paper in flat position, facilitating its severance. A radial blade 46 extends lengthwise of the upper roll 41, being secured in a slotted bar 47 seated in aligned slots in the disks 45 and secured therein. The blade has a serrated free edge projecting beyond the peripheries of the disks 45. The teeth 48 of said edge are triangular. The projecting edge of the blade 46 settles into aligned grooves 49 formed in the lower disks 45a. When the teeth 48 first engage the strip 31 they form perforations, then as they sink deeper, the perforations are elongated to become a continuous cut which separates the sleeve blank from the strip. There is a support 50 for the strip 31 between the pairs of rolls thus far described, and a similar support 51 bridging the space between the roll supporting frames 16 and 17, this support being formed of telescopic sections 18 and 19, providing an extensible planiform sleeve blank supporting surface. Said support extends between the opposite face plates of the respective roll supporting frames and are secured thereto.

Passing now to the roll supporting frame 17, the next pair of rolls in sequence are the upper and lower driven rolls 52 and 52 (see Figure 23) mounted respectively upon the shafts 54 and 55. These rolls consist, respectively, of three disks each, 56, 57 and 58, and 56a, 57a and 58a. The disks 56 and 56a and the disks 57 and 57a are in registry. The disks 58 and 58a are partially offset. The middle disks 57 and 57a are feed disks. The disks 56 and 56a cooperate in creasing up the triangular ear 59 shown in the formed sleeve blank in Figure 29. This ear is provided to prevent the outer edges 60 and 61 of the valve sleeve from being congruent when the blank is folded up along the line X—X to form the sleeve, so as to facilitate the grasping of a single edge in opening the sleeve for filling the bag.

The upper disk 56 is provided at two opposite peripheral arcs with arcuate recesses 62 of 90° amplitude and of uniform depth radially, opening in the outer face of the disk and having an inclined planiform back wall 63, the leading end of which substantially meets the plane of the outer face of the disk. A creasing blade 64 is secured within each recess against its back wall, having a flat peripheral edge concentric with the periphery of the disk and extending a short distance outwardly therefrom. The creasing blades of the upper disk 56 ride in complementary shallow inclined grooves 65 in the lower disk 56a. The creasing blades closely engage the back walls of the grooves 65, which grooves are wider than the creasing blades so that there is room in the grooves in front of the blades to turn the ear up against the blades, by camming against the front wall of the grooves. The open sided recesses 62 permit the progressively widening ears to sweep in against the creasing blades as they are folded up. The coacting peripheral arcs of the disks 56 and 56a between the recesses 62 roll against the marginal portion of the blank along the edge 60, Figure 28. It is obvious that in one revolution, disks 56 and 56a fold up the ears of two successive blanks.

The cooperating disks 58 and 58a are concerned with applying a pair of spaced parallel paste lines to the under side of the sleeve blank. The disk 58 forms a back stop for the paper, while the disk 58a applies the paste to the under side. The disk 58 has a central peripheral groove 66 which defines side flanges 67 and 68. It is these that bear against the paper. The disk 58a is formed as a spool, having spaced deep end flanges 69 and 70 extending from a central hub 71. The flanges 69 and 70 have flat peripheral edges which dip below the level of liquid paste in an underlying paste pot 72. The disk 58a is offset with respect to the disk 58 so that one of the paste applying flanges 70 comes opposite the groove 66, while the other paste applying flange 69 comes to one side of the flange 67. The idea is not to have the flanges 69 and 70 be in registry with the flanges 67 and 68, for this would cause the applied paste to be squeezed out into a film of almost imperceptible thinness. It is the purpose of the offset relationship of the flanges to permit the paper to yield slightly to the pressure of the flanges 69 and 70 to cause the deposit of lines of paste of thickness adequate for the pasting operation.

The line of fold of the flange 59a, Figure 28, which is made by the next pair of rolls to be described, comes midway between the spaced lines of paste. A scraper 73 is secured within the paste pot 72, as shown in Figure 27. It has two slots of a width to closely receive the peripheral margins of the disks 69 and 70, the sides of which slots scrape paste from the sides of said margins, keeping them clean. The end walls of the slots are at a slight distance from the peripheral faces of the flanges, one of said end walls being shown at 74 in Figure 27. Said distance can be varied by means of the adjusting screw 75, and the amount of paste carried up to the paper thereby controlled.

The paste pot 72 is freely seated between angle flanges 76 on the bed plate at the opposite ends of the paste pot, the latter resting upon the bed plate over a hole 77 wide enough to permit the paste pot to be removed through it, but shorter than the length of the paste pot, so that the latter has to be first tilted before it can pass through said hole. A handle 78 on the bottom of the paste pot extends through said hole and is used in tilting and removing the paste pot.

Posterior to the ear forming and paste applying rolls last described are the pair of upper and lower driven rolls 79 and 80, each consisting of three disks, respectively, 81, 82 and 83, and 81a, 82a and 83, on the respective shafts 88 and 89. The registering disks 81 and 81a and 82 and 82a are feed disks. The disks 81 and 81a are in line with the ear forming disks of the previous set of rolls and press the upturned ear flat against the blank as it passes between them, as shown at 88a in Figure 24. The disks 83 and 83a cooperate to produce the down-folded flange 59a. The disk 83 has a cylindrical peripheral face portion 84 with a flange 85 at its outer end beveled on the inner side. The cooperating disk 83a has its outer face in a plane inwardly offset from the plane of the base of the bevel by a distance equal to the thickness of the paper. The disk 83a is narrow, so as to roll between the paste lines 86 and 87. The plane of the outer face of the disk 83a intersects the paper midway between the paste lines, so that the latter are equidistant from the line of fold, one being on the flange and the other on the under side of the blank adjacent the flange. The beveled flange acts as a cam to turn down the flange 59a over the outer edge of the disk 83a. The tendency of the paper is to rise in that portion immediately to the left of the flange 59a (see Figure 24) as said flange is turned down. This portion of the paper is positively held flat by the relatively wide cylindrical face 84 of the overlying disk 83.

Figure 4:
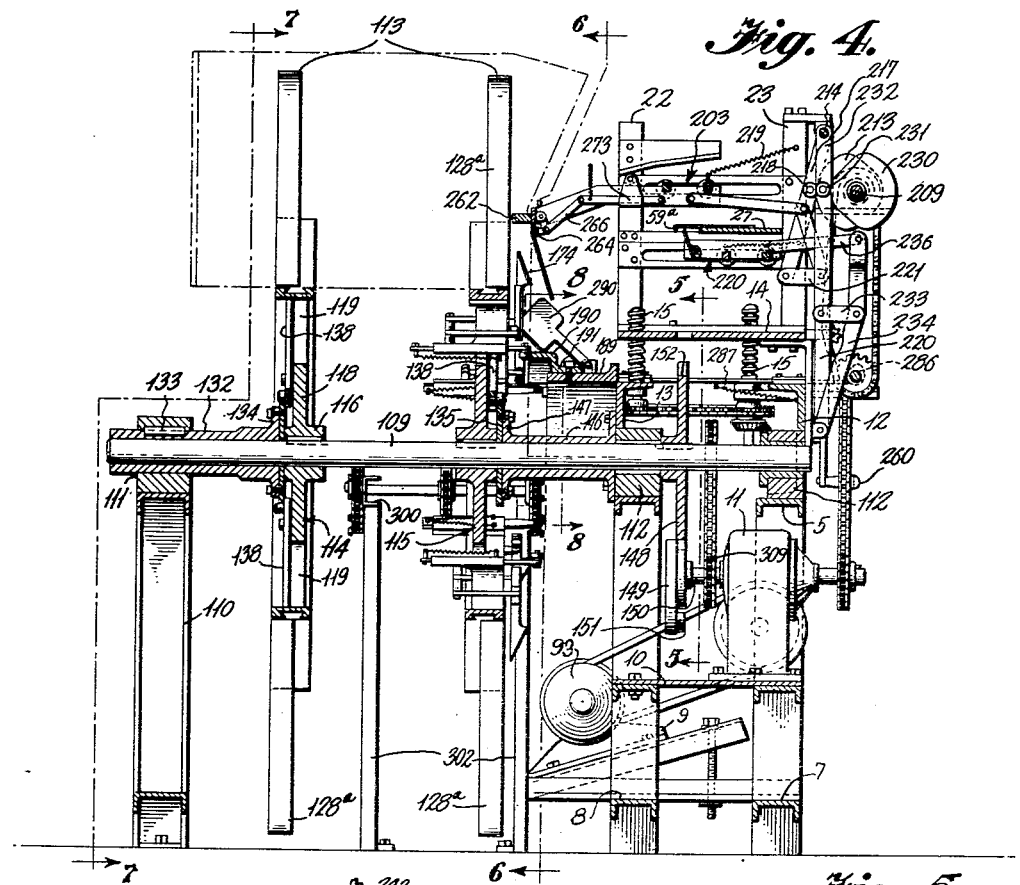
Figure 4 is a vertical cross-section taken along the line 4—4 of Figure 2.
Figure 17:
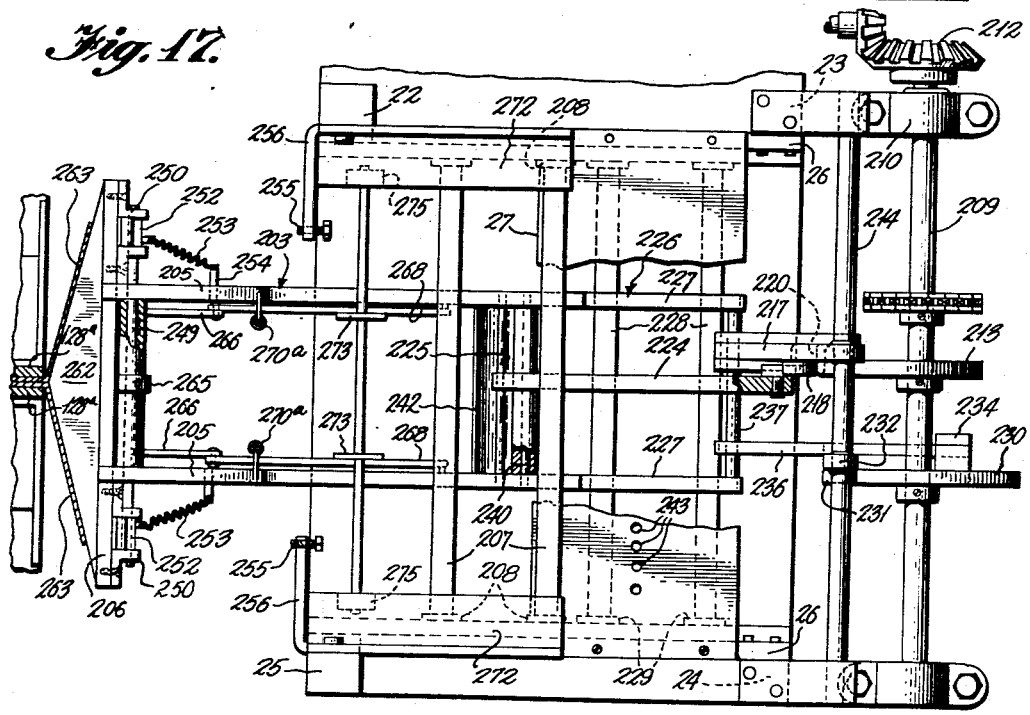
Figure 17 is a horizontal section taken along the line 17—17 of Figure 16.

The feed disks 81, 81a and 82, 82a convey the blank to the platform 27 upon which it is deposited. Figures 4, 16 and 17 show that the platform 17 is so narrow and so placed that the blank lies upon it with its flange 59a and the paste lines some distance off of the adjacent longitudinal edge of the platform.

The sequence of operation, generally stated, is that the paper strip 31 is drawn from the supply roll on the shaft 30 by the first pair of rolls 32 and 33, severed between the next pair of rolls 41 and 42, the severed blank being drawn toward the ear forming rolls 52 and 53 by the feeding disks which form components of the ear forming rolls and the flange folding rolls 79 and 80. The blank passes between the ear forming rolls, where the ear is folded up and the lines of paste applied, and then beneath the flange folding rolls where the flange is folded down. It is apparent that the distance from the severing point, which is in a vertical plane through the axes of the rolls 41 and 42, to the gripping point of ear forming rolls, which is in a vertical plane through the axes of these rolls, must be the length of the sleeve blank, in order for the severed blank to be picked up by the ear forming rolls. As a matter of fact, this machine is designed to produce sleeve blanks of different length as required for the sleeves of different sized bags, and the roll supporting frame 16 is therefore made slidably adjustable along the bed plate in order to space the severing point from the gripping point of the ear forming rolls a distance equal to the length of the blank to be produced.

Figures 21, 22 and 29 show that the lower ends of the face plates 20 of the roll supporting frame 16 are slidable in longitudinal guideways on the face plate, formed between track elements 89a and 90 secured to the bed plates, said lower ends being formed with flanges 91 retained in under cut grooves in the track elements 90. The frame 16 is fixed in adjusted position by set screws 92 in the track elements 90 engageable with the flanges 91.

The drive for the several pairs of rolls is designed to allow the change-over from sleeve blanks of one length to blanks of another length. It will be noted from Figures 1 and 2 that the source of driving power is the motor 93, which through gear reduction in the box 11, drives a sprocket 95 which operates a chain 96 that passes about sprockets on the shafts of the lower rolls of the blank severing pair 41 and 42, and the ear forming pair 52 and 53, and that the upper rolls of each of these pairs are gear connected to the lower rolls. The lower roll of the flange folding pair 79 and 80 is gear connected to the ear forming rolls through an idler 97. The driving ratio of these three pairs of rolls is such that each rotates at the same linear speed, which is invariable regardless of the length of the blank being cut. The draft of the ear forming and flange folding rolls pulls the severed blank away from the severing station. The draft of the first pair of rolls 32 and 33 draws the strip from the supply roll and pushes it toward the severing station. It will be recalled that the rolls 41 and 42 at the severing station have no feeding function.

Figure 2:
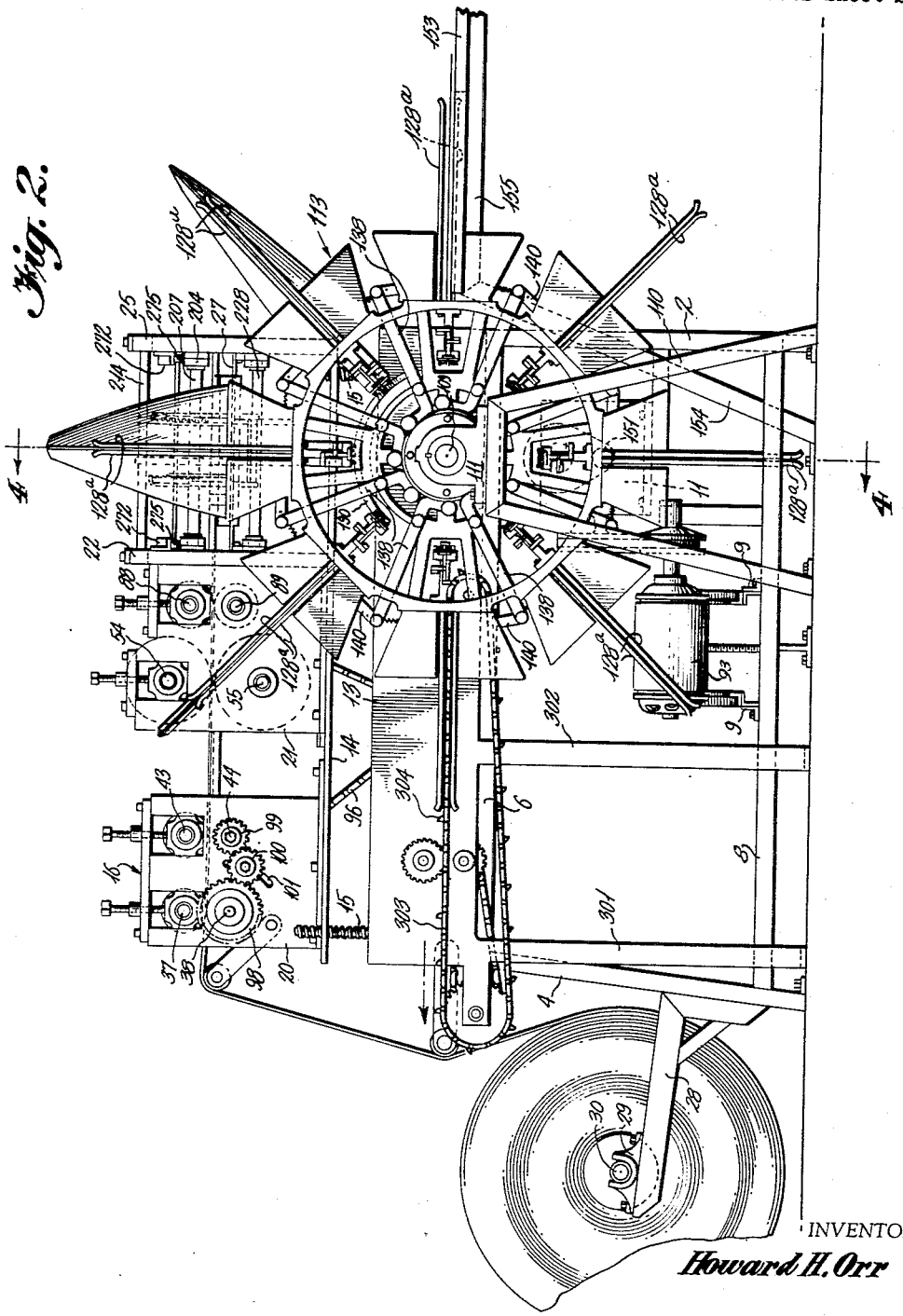
Figure 2 is a side elevation looking at the reverse side of the machine.

Figure 2, which depicts the reverse side of the roll supporting frame 16, to that shown in Figure 1, shows that the first pair of feed rolls 32 and 33 is driven through a gear train from the lower chain driven roll 42 of the severing pair. This gear train comprises a gear 98 on the roll 33, a gear 99 at the end of the chain driven shaft 44, and an idler 100 between them. The gear 99 is interchangeable with gears of different size, which necessitates provisions for shifting the position of the idler, according to the diameter of the gear used. The adjustment of the idler is accomplished by providing a slot 101 in the adjacent face plate and a pin 102 having a portion of relatively large diameter upon which the idler is journaled, and a portion of smaller diameter fitting the slot and playing therein, with a nut on its end for fixing the adjustment (see (Figures 2, 21 and 27). The shoulder formed at the point of diameter reduction abuts against the face plate at the sides of the slot, to prevent the idler from binding.

It is now apparent that while the progression of the several blanks is at an invariable speed from the moment of their severance from the strip, and that the speed of rotation of the severing rolls is invariable, the rate of progress of the strip between the severing rolls is varied to produce sleeve blanks of different length. The slower the rate of progress of the strip, the less length of material will have passed the severing point between revolutions of the severing blade.

The machine illustrated is set up to produce a sleeve blank twelve inches long. This capacity limit is fixed by the circumference of the ear forming rolls which is twenty-four inches, both of the creasing blades being set to produce two ears per revolution. The gear 99 is of such size as to give the strip feeding rolls 32 and 33 the same linear speed as the sleeve blank moving rolls.

Referring now for convenience to Figure 27, the roll supporting frame 16 is adjusted so that it is twelve inches from the severing point to the gripping point, the latter being the point of tangency of the feed disks 57 and 57a of the ear forming rolls 52 and 53. The severing blade 46 in its initial arcuate movement following severance, gives the blank a little push that ensures its being gripped by the ear forming rolls. The creasing blade 64 is six inches long, measured along the circumference of the disk on which it is mounted, and its leading end is displaced ninety degrees from the point at which the blank is gripped by the rolls. Therefore, the leading end will make contact with the blank at the edge when six inches of the blank has passed between the rolls, and said blade in cooperation with the complementary groove 65 will crease up a progressively widening ear, terminating at the trailing end of the blank. Since the linear speed of the strip feeding rolls and ear forming rolls is the same, the next succeeding blank will follow the first blank with its leading edge substantially in abutment with the trailing edge of the first blank, and will be gripped by the ear forming rolls in proper phase to be provided with an ear extending from the middle point in its length to its trailing edge, means by the opposite blade 64 and its complementary groove.

It will now be explained how the machine is set to produce a shorter blank, for example specifically a six inch blank. First, the roll supporting frame 16 must be moved closer to the roll supporting frame 17, so that the distance from the severing point to the gripping point is six inches. To facilitate this adjustment, one of the track elements 89a associated with the roll supporting frame 16 is provided with a scale 327, referred to an index mark 328 on the adjacent face plate 20, the scale indicating in inches the position of the frame 16 for various sleeve blank lengths. It is now necessary to change the phase of the leading edges of the blade 64 with respect to the gripping point, since the blade must begin to contact the blank at its middle, which is three inches from its leading edge. This change of phase is accomplished through the following instrumentalities.

Referring to Figures 1, 23 and 26, it will be seen that the driving gear 103 which is keyed to the shaft 55 of the lower ear forming roll is recessed on the front to receive a circular plate 104 which is freely revoluble on said shaft. Said blade is unitary with the gear 105 which is driven by the main driving chain 96. The plate 104 has a pair of opposite arcuate slots 106 concentric with the shaft 55. Bolts 107 play in said slots and are screwed into the gear 103. Said bolts adjustably clamp the plate 104 to the gear 103. The shaft 55 passes through the gear 105 and has a nut 108 on its threaded reduced end which clamps said gear to said shaft. To set the ear forming rolls 52 and 53 in phase for a six inch blank, one loosens the bolts 107 and the nut 108, then turns the rolls clockwise, as viewed in Figure 27, until the leading edge of a blade 64 is three inches, circumferentially measured, from the point of tangency of the rolls. This may be done most conveniently by folding a spare six inch blank double to establish a middle crease, opening it, holding it with the crease at the leading edge of the blade and with the anterior portion of the blank pressed against the circumference of the feeding disk 57 and rotating the rolls until the leading edge of the blank begins to be pinched between the disks 57 and 57a. The adjustment thus obtained is fixed by tightening the bolts 107 and the nut 108.

Next, the gear 99 must be substituted by a gear which reduces the linear speed of the strip feeding rolls 32 and 33 by one half. It is readily seen that only one half as much paper will pass the severing point to each revolution of the knife 46, as in the former case, so that blanks six inches long will be cut off. The first blank will be gripped by the ear forming rolls as soon as severed, and from that moment it will travel twice as fast as the end of the strip advancing between the severing rolls. A progressively increasing gap will therefore open up on the platform 51 between the leading edge of the first blank and the leading edge of the strip. When the ear forming rolls have revolved one half of their circumference, or twelve inches, this gap will be six inches wide and the leading edge of the second blank at the moment of its severance from the strip will be at the gripping point, and the opposite blade 64 will be in proper phase to crease the ear when three inches, or one half of the blank has passed between the ear forming rolls. Meanwhile, the first blank will have passed under the control of the flange folding rolls 79 and 80, which travel at the same linear speed as the ear forming rolls. In the first six inches of their revolution, the ear forming rolls have fed the first six inch blank to the flange folding rolls and during the next six inches of their revolution they have rotated in the gap between the first and second blanks.

The machine illustrated has the capacity to make sleeve blanks from six inches to twelve inches in length, and all standard lengths in between, by providing substitute gears for the gear 19 that will give the proper linear speed differential between the strip feeding rolls and ear forming rolls to produce the length of blank desired. For each length of blank the phase of the ear forming blades must be adjusted in the manner above explained, and the roll supporting frame 16 must be shifted to place the point of severance the same distance from the gripping point as the length of the desired blank.

Since sleeve blanks may be of different width as well as length, to suit the requirements for different bags, it is obvious, referring to Figure 23, that by shifting the ear forming disks 56 and 56a lengthwise on their shafts their lefthand faces can be brought into coincidence with the adjacent edges of blanks of different width, it being assumed that the opposite edges are always in the same position relative to the righthand ends of the ear forming rolls. Just in case the necessity should arise for producing blanks narrower than the range of shift of the disks 56 and 56a will provide for, said disks are provided with an auxiliary set of recesses 62a with planiform shoulders 63a for blades, not shown, similar to blade 64, and complementary grooves 65a. These recesses and grooves are ninety degrees displaced with respect to the ear forming devices on the opposite side of said disks, in order to utilize vacant spaces on the peripheries of the disks. Said blades and their complementary grooves are oppositely slanted and will produce ears on the leading half of the blank instead of on the trailing half, but this is of no moment, since it is immaterial in the folded sleeve, which half has the ear, the main purpose of which is to avoid congruency in the edges of the mouth of the sleeve.

The foregoing completes the description of the blank forming unit and its mode of operation. At the end of the sequence of the instrumentalities involved, the conformed sleeve blank with wet lines of paste is deposited upon the platform 27 with the flange 59a and paste lines overhanging the longitudinal edge of the platform. This may from now on be considered the front edge of the platform, since the sleeve blanks will be transferred with their flanged sides leading, into the confronting open ends of bags brought successively into receiving proximity to the front edge of the platform by suitable indexing apparatus now to be described.

Figures 1 and 2 show the ends of a shaft 109 which penetrates the deep channel beams 12 and 13 of the main frame and extend transversely of said frame in a vertical plane that intersects the middle of the platform 27, Figures 2 and 4 show that the end of said shaft remote from the main frame is supported by a standard 110. The shaft is journaled in a bearing 111 on top of the standard, and bearings 112 fixed within the channel beams 12 and 13, said bearings being suitably bushed. An indexing drum 113 is carried by the shaft 109 rotatable therewith. This consists of two spaced wheels 114 and 115 keyed to the shaft. These wheels are basically similar. Their shape may best be discerned from Figures 2 and 7. Each has a hub 116 and four similar Y-shaped spokes 117 symmetrically disposed on opposite sides of perpendicular diameters. Each spoke consists of a stem 118 emanating from the hub and convergent limbs 119 extending from the outer end of the stem to the rim 120. Perforated lugs 121 extend outwardly from said limbs at their base. The rim is generally circular in contour on the inside. On the outside it is octagonal, having eight spaced flats 122 of equal length perpendicular at their middle points to radii forty-five degrees displaced, alternate of which radii coincide with the perpendicular diameters with which the spokes 117 are symmetrical.

Figure 7:
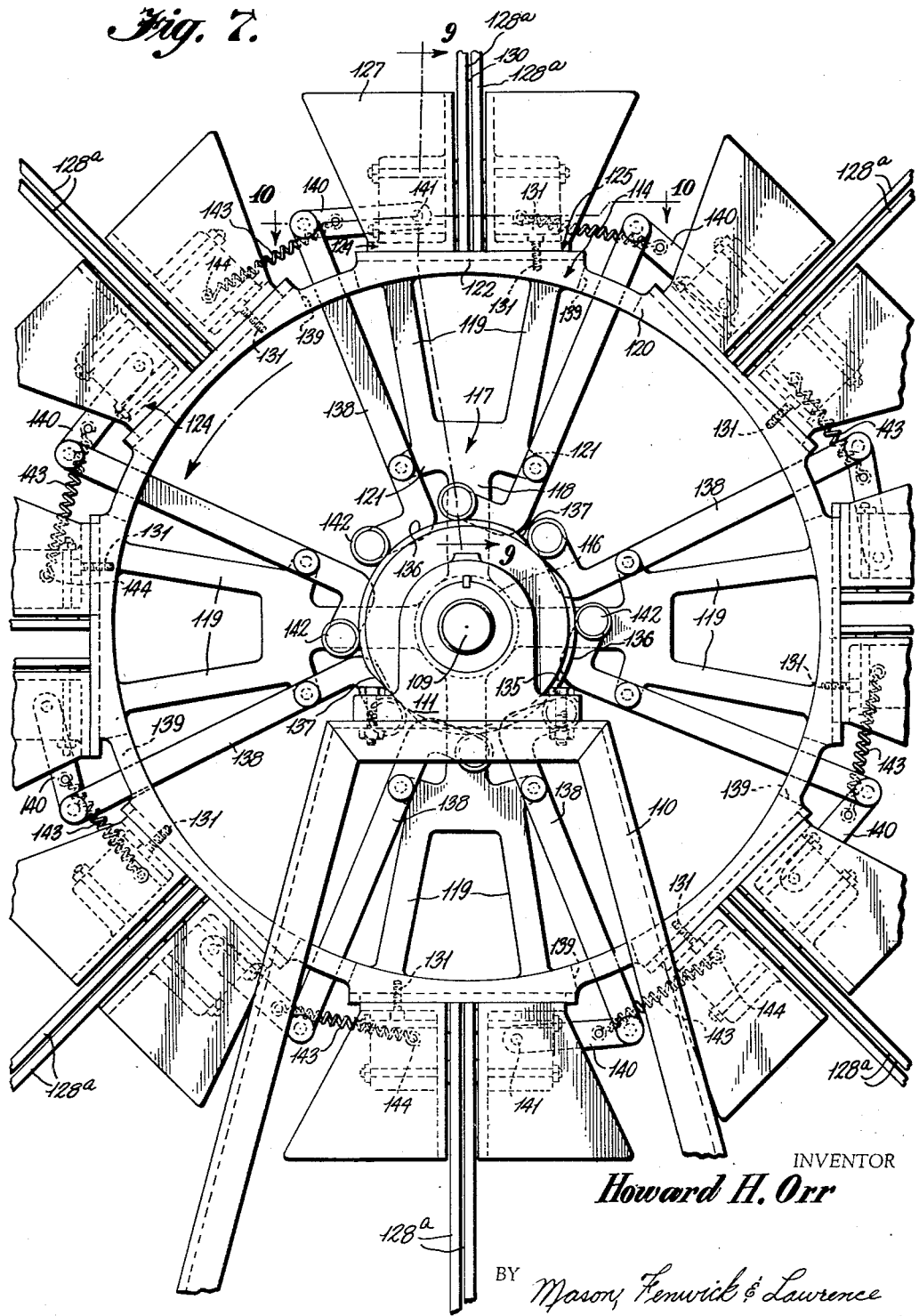
Figure 7 is a vertical cross-section taken along the line 7—7 of Figure 4.
Figure 10:
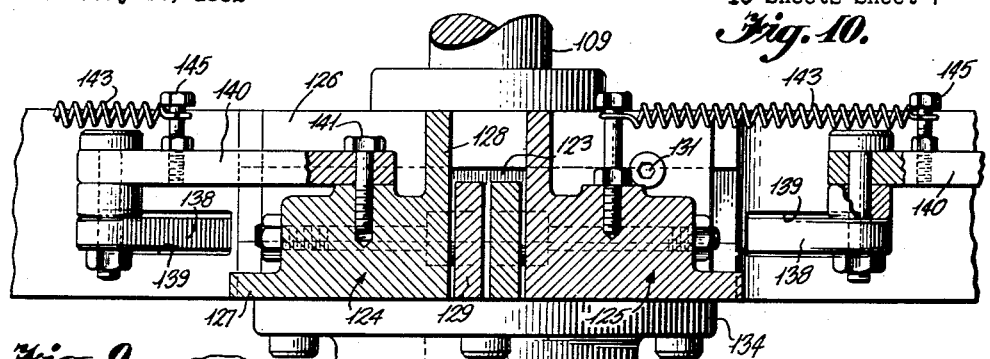
Figure 10 is a section taken along the line 10—10 of Figure 7.
Figure 9:
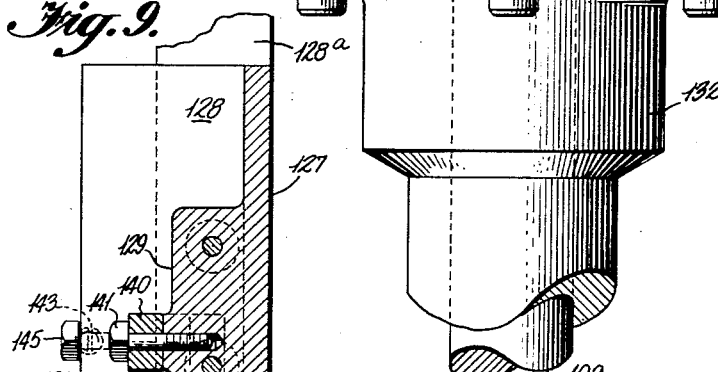
Figure 9 is a section taken along the line 9—9 of Figure 7.
Figure 8:
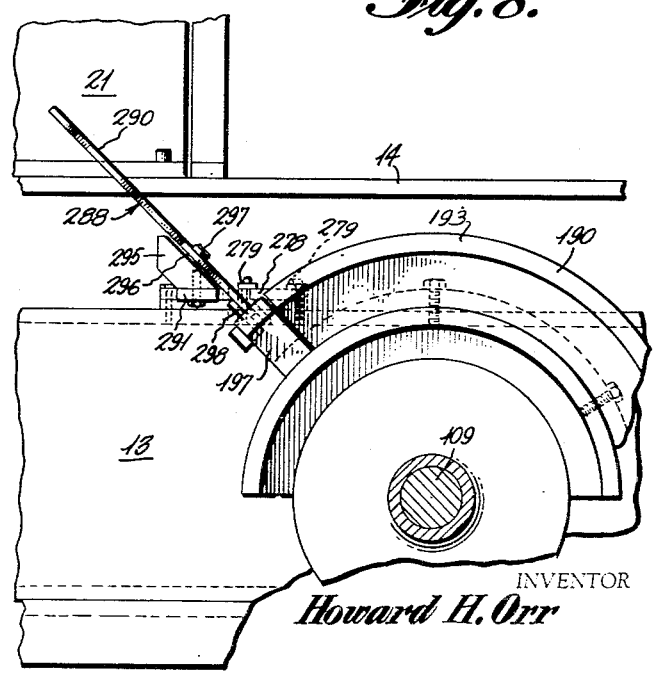
Figure 8 is a vertical cross-section taken along the line 8—8 of Figure 4.

Each of said flats is formed in its outer face with an open ended longitudinal dovetail groove 123, best shown in Figures 9 and 10. A pair of left and right clamping members 124 and 125 are seated in each of the dovetail grooves. The shape of these clamping members may be gathered from Figures 7, 9 and 10. Figure 7 shows that each has a base flange 126 resting on the flat, with a complementary dovetail rib on its bottom, slidably fitting the groove, an outwardly extending wing 127 broad in the plane of rotation of the wheel, the shape of which is shown in Figure 7, and an outwardly extending flange 128 in a plane perpendicular to the face of the flat, and transverse thereto.

The base flange 126, wing 127 and transverse flange 128 are an integral member having a massive boss 129 at the rear, providing for certain bolt holes. At the front side of the flange 128 a clamping arm 128a is bolted. Said arm extends outwardly to a distance approximately the width of a flat bag, as shown in Figure 1. A pair of clamping members are set in each groove with their clamping arms 128a in close juxtaposition, as indicated at 130 in Figure 7, the distance between them being the thickness of a flat bag when compressed. One member of each pair is fixed. In the drawings (see Figures 7, 9 and 10), the member 125 on the trailing side, with reference to the direction of rotation of the wheel, is fixed by the set screw 131. The other member 124 is slidable in and out in the dovetail groove to open and close the clamp constituted by the clamping arms 128a. It is operated by the following mechanism. With respect to the outer wheel 114, the bushing 132 of the shaft bearing 111 carried by the standard 110 is made nonrotatable by being keyed to the bearing, the key being shown at 133 in Figure 4. The bushing extends inward to a point within the plane which bounds the adjacent face of the wheel rim, where it is expanded into a flange 134, to which a cam plate 135 is fixed, coaxial with the shaft 109, having opposite circular elevations 136 alternating with opposite flat depressions 137. A rocking lever 138 is fulcrumed in the lug 121, having a long arm extending through a slot 139 in the wheel rim between adjacent flats and pivotally connected to a link 140, which in turn is pivotally connected to the clamping member 124 by the bolt 141. The short arm of said rocking lever carries a roller 142, which is urged against the cam plate 135 by a spring 143 anchored to the fixed clamping member of the adjacent pair by the bolt 144, and at its other end to the link 140 by the bolt 145. When the roller 142 rides upon one of the elevations 136 of the cam plate the clamping member 124 is pushed towards closed or clamping position with respect to the cooperating fixed clamping member, and when the roller falls into one of the depressions 137 of the cam plate, the spring 143 opens the clamp.

Figure 6:
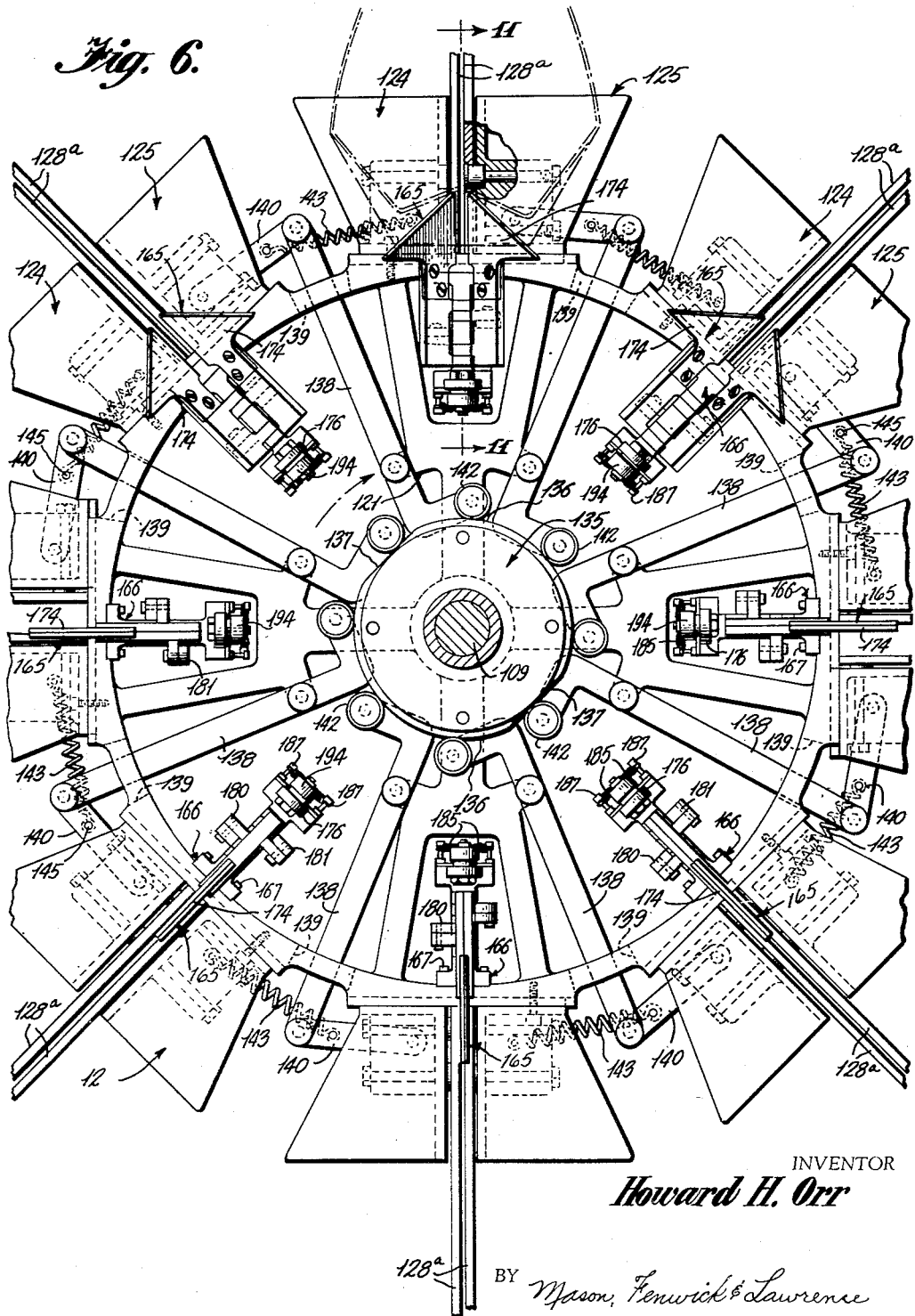
Figure 6 is a vertical cross-section taken along the line 6—6 of Figure 4.

With respect to the inner wheel 115, Figure 4 shows a spool shaped spacer 146 surrounding the shaft 109, bolted at one end to the adjacent channel beam 13 and having a flange 147 at its opposite end within the bounding plane of the adjacent face of the wheel rim, to which flange a cam plate is attached identical to the cam plate 135 previously described, and indicated by the same reference numeral. The cam plates 135 are in the same angular phase. The elements associated with the wheel 115 for operating the movable clamping members are similar to those associated with the wheel 114 and are similarly designated (see Figure 6). The wheels 114 and 115, constituting the indexing drum 113 are in the same angular phase with respect to the axis of the shaft 109 on which they are mounted, so that corresponding pairs of clamping arm 128a are in transverse alignment.

The indexing drum is driven by a Geneva wheel 148 keyed to the shaft 109 at a point between the channel beams 12 and 13. This wheel is operated by a crank arm 149 on a shaft 150 that extends from within the reduction gear box 11. The crank arm has a roller 151 that intermeshes with the slots 152 in the Geneva wheel and imparts step by step movement to the indexing drum, each step of movement being through an arc of forty-five degrees. Significant periods of dwell of the indexing drum are when the clamping arms are in an outwardly horizontal position where bags are introduced into the indexing drum; when they are in upward vertical position at which dwell the sleeve blanks are attached to the bags; when they are forty-five degrees beyond the upward vertical position, where the valves are formed and the inserted sleeve blanks simultaneously creased in situ within the valves; and when they are in an inwardly horizontal position to permit the removal of the valved bags with the incorporated sleeves.

Figure 3:
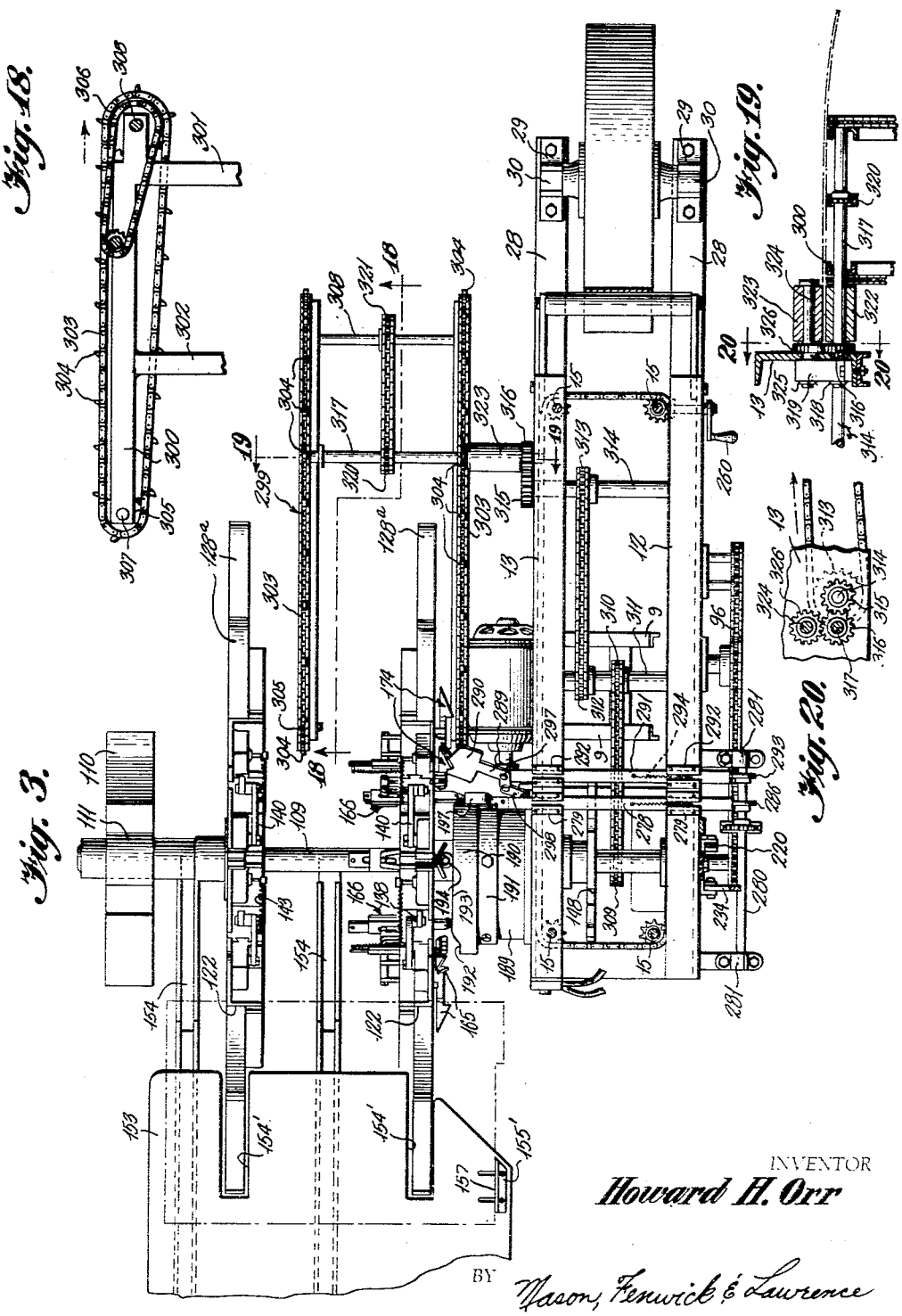
Figure 3 is a horizontal section taken along the line 3—3 of Figure 1.

Figures 1, 2 and 3 show that there is a table 153 at the outer side of the indexing drum, the supporting frame for which being partially shown at 154 and 155. This table is for the purpose of holding a supply of valveless bags in flat form, from which supply one bag at a time is inserted between the clamping arms which at the time are in open position. It will be noted that the surface of the table is flush with the upper side of the lower clamping arm of a pair when the pair is horizontal, and that the outer ends of the arms 128a are divergently bent to form a flaring mouth. This enables the bag to be slid from the surface of the table into the transversely aligned clamps with facility and without lifting the bags. In Figure 3 the table is shown as being slotted at 154' to allow the passage of the outer portions of the clamping arms. The attitude of the bag is shown in broken lines in Figure 3, the sides being parallel to the axis of the indexing drum, the open end facing the forward side of the table with the corner which is to be infolded to form the valve toward the apparatus. The edge of the open end of the bag must be located with fair precision in order that as it is slipped into place it will meet the gusset spreading means at the proper point. Therefore, a guide 155' is provided adjustably mounted in slots 156 in the table, said guide presenting an upstanding flange 157 parallel to the plane of rotation of the indexing arm, against which flange the edge of the bag is moved in sliding it into the clamps. When fully seated in the clamps the leading side of the bag rests against the flats 122 of the respective wheels of the indexing drum.

Those clamping arms which are adjacent the tops of the bags embrace the bags closely when closed, just sufficiently to the rear of the mouth edge of the bag to permit the infolding of the valve in front of said arms. The remote clamping arms engage the bags near their bottom. In the rotation of the indexing drum the clamping arms close upon the bag after they move upward from the loading table, and they remain closed until the bag passes beyond the valve forming and sleeve creasing station.

The wheel 115 carries adjacent the base of each pair of clamping arms the means for spreading the mouth of the bag while the latter is en route from from the loading station to the vertical or sleeve blank receiving station. The mouth of the bag is opened by spreading the gusset on that side of the bag which is toward the axis of the wheel, at a point immediately in front of the forward clamping arms.

Said gusset spreading means is the spear headed member 165 which will have entered into the gusset in in closed position when the bag is moved to its final position between the clamping arms, resting against the flats 122. The gusset spreader is shown in detail on an enlarged scale in Figures 6, 11, 12 and 13. The wheel 115 is provided on the inside of the rim with a supporting block 166 for each flat, positioned so as to be symmetrically intersected by radial planes through the middles of the flats. The blocks 166 are bolted to the rim, as shown at 167, the inner circumference of the rim being milled flat where engaged by the blocks, to provide a flat interface between the blocks and rim. Figure 11, which illustrates a transverse section through the block in a radial plane, shows that it is L-shaped, having an extension 168 projecting axially inward of the wheel. It also has a perforated lug 169 extending outwardly in an axial direction on the side opposite the extension. The gusset spreader 165 is mounted on this lug. It is a hinge member comprising two leaves 170, each with perforated ears 171 and 172 hinged about a pintle 173, mounted in said lug. Each of said hinge leaves has a spear headed blade 174 fixed to the upper end thereof. The adjacent sides of said blades are in line with the axis of the pintle 173. The blades 124 do not come together when in relatively closed position, but remain parallel, spaced apart sufficiently to allow room for a flat pleat which is created later, incident to the infolding of the bag, to enter between them.

The gusset spreaders 165 are operated by the following mechanism. The bottom of each of the supporting blocks 166, including the extension 168, is formed with a channel 175 extending parallel to the axis of the indexing drum. A slide 176 reciprocates in this channel, said slide being retained by a bolted-on cover plate 177 that closes the lower side of the channel. The extension 168 is formed with a closed ended slot 178 opening into said channel. A post 179, perpendicular to said slide and parallel to the pintle 173 is secured to said slide and plays longitudinally in said channel. Links 180 and 181 are pivotally mounted on said post and pivotally connected to ears 182 on the respective hinge leaves 170, which ears are offset radially from the axis of the pintle 173. Said links are maintained parallel by a shoulder 183 on the post against which one rests, and a spacer 184 between the two.

A pair of springs 185 have a common anchorage at one end of the post 186 fixed to the slide and are anchored under tension at their opposite ends to posts 187 fixed to the supporting blocks at opposite sides of the middle web 188 of said block. If said web were not in an obstructive position, one spring would suffice. When the slide moves to the left, as viewed in Figure 11, the links open the blades 174. When it moves to the right, the blades are closed.

Figures 3 and 4 show a spacer 189 in the form of a semicylindrical shell concentric with the shaft 109, arranged above its horizontal diametrical plane, flanged at one end and secured by its flanged end to the adjacent channel beam 13 of the main frame. A semicylindrical cam member 190 has a reduced portion 191 lapping the opposite end of the spacer 189 and secured thereto. Its arcuate face is above its horizontal diametrical plane. The end edge of said cam member provides the cam face, there being a dwell or depression 192 at the leading end rising by an inclined shoulder to the elevation 193 which is in a plane perpendicular to the axis of the shaft 109 and continues to the trailing end of the cam member. A roller 194 journaled on a shaft 195 at the end of the slide 176 adjacent the cam member 190, makes contact with said cam surface, being pressed thereagainst by the springs 185. The end wall 196 of the slot 178 engages the post 179 when the roller falls off of the trailing end of the cam member, acting as a stop to keep the roller from falling so far that it will not be picked up by the dwell 192 when it comes around to the leading end of the cam member. Said cam member positively opens the hinge leaves and including the blades 174. The springs 185 close them.

It may be stated at this point that a small portion of the cam member at its posterior end, the part designated as 197 in Figure 3, is recessible to create an abrupt recess opening in the elevation of the cam surface at periods timed to occur at the stopped intervals of the indexing drum. The purpose and function of this part will be described in due course.

The sequences attending the travel of a bag from the loading station to its upper vertical position on the indexing drum will now be described. A single bag in flat condition is taken from a stack on the table 153, and is placed on the table in the position shown in broken lines in Figure 3, the edge of the mouth of the bag beyond the prolongation being against the adjusted guide 155 parallel thereto. When the indexing drum stops, axially aligned pairs of clamping arms 128a are in open position at the table, confronting the bag, the lower arm of each pair being substantially flush with the surface of the table, as shown in Figure 1. The bag is quickly slipped between the clamping arms until its forward side strikes the flats at the base of the clamping arms. The hinge blades 174, which at that time are in closed position, will have entered between the sides of the gusset, their apex being at the middle crease of the gusset. Although the sides of the gusset are, at the time, flat, they are not under compression by the clamping arms and there is ample space between the sides of the gusset to permit the hinge blades to enter between them in closed position. When closed, the hinge blades, as has been stated, are in parallel planes but spaced apart.

After the clamping arms leave the loading station they close upon the bag, and subsequently but before they reach the vertical dwell, the hinge blades open, spreading the sides of the gusset abruptly at a wide angle. The tensioning of the gusset forwardly of the hinge blades creates a transverse fold line 161 across the gusset between the points where the inclined edges of the hinge blades contact the outer fold lines of the gusset, so that the portion 162 of the gusset forward of said fold line is planiform and perpendicular to the immediately adjacent parts of the sides of the bag, with a predilection to buckle inwardly, being intersected longitudinally by the middle fold line of the gusset. The prolongation 198 forms three sides of a rectangle at the mouth of said bag, the bottom side being substantially horizontal when the bag is at the vertical station and the short sides 199 of the prolongation being also in a substantially horizontal plane, the parts of the bag referred to being shown in Figure 30.

Referring now to the third or transfer unit, the vertical posts 22, 23, 24 and 25 which are shown particularly in Figures 14, 16 and 17 have already been described as components of a frame which supports the platform 27. They also serve as a framework to support the transfer mechanism. Figures 14 to 17 show that there are two pair of parallel guideways 200 and 201, one pair above the platform 27 and the other pair immediately below it. The guideways are alike. Each consists of a cross bar having a longitudinal closed ended guide slot 202, best shown in Figures 14 and 15. The upper guideways 200 are arranged at the same level, bridging the posts 22 and 23 on one side and the posts 24 and 25 on the opposite side, and being secured thereto. The lower guideways 201 are correspondingly positioned with respect to the posts and secured thereto, but at a lower level.

The upper carriage 203 comprises a pair of parallel bars 204 having downwardly deflected forward portions 205, and having a horizontal press plate 206 secured at their forward ends. Said press bar may be as long or longer than the width of the valve when spread. The bars 204 are notched to receive spaced parallel cross bars 207 fixed thereto and extending beyond the outer sides of said bars 204. The cross bars have flanged rollers 208 journaled at their ends, the rollers tracking in the slots 202, while the flanges run just inside of the guideways and prevent endwise shift of the carriage.

The carriage 203 is operated by the following mechanism. There is a cam shaft 209 journaled in bearings 210 mounted on brackets 211, said brackets being fixed to the sides of the posts 23 and 24 (see Figure 1). This cam shaft is driven by gearing 212, which is operatively connected to a gear train including the gears 80 and 97, Figure 1, driven from the main driving chain 96. The cam 213 is concerned with moving the upper carriage. Figures 14 and 17 show a horizontal hanger bar 214 parallel to the cam shaft 209, supported at its ends in eyes 215, which project from brackets 216 carried on top of the posts 23 and 24. A link 217 swings from the hanger bar, having a roller 218 contacting the surface of the cam 213 under the bias of a spring 219 anchored between the carriage and the post 23, and so disposed as to pull the carriage rearward, that is, toward the cam shaft. The lower end of the link 217 is connected to a pitman 220 at an intermediate point by the link 221. The lower end of the pitman is pivoted in a bearing lug 222 on one side of an adjustable plate 223 fixed to the outer face of the channel beam 12 of the main frame, Figure 1. The upper end of the pitman 220 is connected to the carriage by a thrust link 224, the forward end of which is pivoted to the middle of a round cross rod 225 bridging the space between the bars 204, having its ends fixed in said bars.

Figure 5:
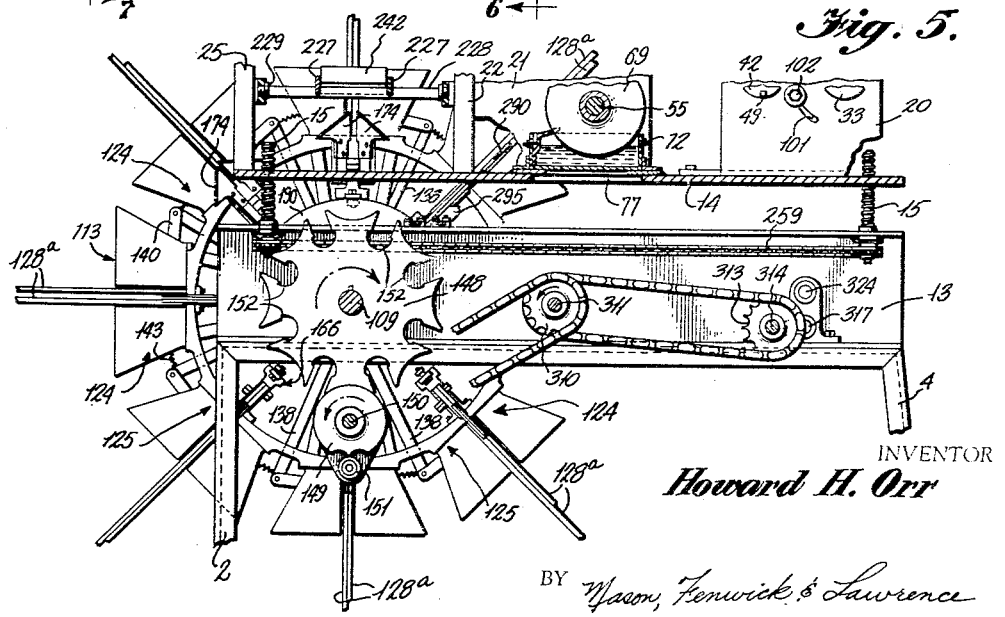
Figure 5 is a vertical cross-section taken along the line 5—5 of Figure 4.

The lower carriage 226 comprises a pair of spaced longitudinal bars 227, Figures 5, 16 and 17, tied together by cross members 228 received in notches in the under sides of the longitudinal bars. Said cross members have flanged rollers 229 at their ends which track in the slots 202 of the lower guideways 201. The drive means for the lower carriage comprises a cam 230 similar to the cam 213 which operates the upper carriage, mounted on the cam shaft 209, but in the opposite phase to the cam 213, so that while one carriage moves in, the other goes out. The cam 230 works against a roller 231 mounted on a link 232 which swings from the hanger bar 214. At the lower end of the link 232 is a pivoted link 233 connected to a pitman 234, the latter being pivoted at its lower end in a bearing lug 235 aligned with the lug 222 and carried by the plate 223. A thrust link 236 is pivotally connected at its respective ends to the carriage and to the upper end of the pitman 234. The forward end of said thrust link is pivoted about a cross bar 237 which bridges the longitudinal bars 227 and is fixed to them at its ends. A spring 238 biases the lower carriage in a leftward direction, as viewed in Figures 14 and 16, and keeps the roller 231 against the cam 230. The forward ends of both carriages face the open valved end of the bag held in vertical position on the indexing drum. Figure 14 shows the upper carriage in its extreme leftward position, and the lower carriage in its extreme rightward position.

The lower carriage at its forward end, has a valve sleeve blank engaging pawl 239. This comprises an elongated hub extending between the longitudinal bars 227, journaled eccentrically upon a shaft 240, Figure 17, the ends of which are fixed in said bars. Said hub carries an upwardly extending supporting plate 241 on its forward side, and an upwardly extending sleeve blank engaging blade 242 is secured to said supporting plate. The upper edge of said blade is horizontal and the length of the blade, as shown, is the distance between the longitudinal bars 227 of the carriage. The distribution of weight of the components of the sleeve blank engaging pawl relative to its axis of rotation is such that it is stable substantially in the upwardly and forwardly inclined position shown in Figure 16.

When the carriage 226 is in its innermost position, the blade 242 of the sleeve blank engaging pawl is adjacent the front edge of the platform 27, its upper end being slightly below the level of the upper surface of the platform. The timing of the movement of the carriage with respect to the feed of the sleeve blanks to the platform is such that each time the blade 242 is in the position shown in Figure 16, a sleeve blank slides down on the platform in the direction facing the observer, viewing Figure 14, overhanging both the front edge of the platform and the blade 242, the latter being slightly out of contact with the under surface of the blank. Since there is a certain amount of free fall of the blank from the rollers 79 and 80 to the platform, Figure 27, great precision cannot be relied upon in the parallelism of the flange 59a with respect to the front edge of the platform, but such precision is not necessary, for when the carriage starts to move forward the blade 242 shifts the flange 59a in parallel relation to itself as it continues forward. In its approach to the flange, the blade 242, being below the level of the surface of the platform, will miss making contact with the line of paste under which it passes, and it will engage the flange along a line somewhat below the corner at the line of fold of the flange but above the line of paste on the flange. The degree of stability of the pawl 239 is such that it will not be upset in a clockwise direction, as viewed in Figure 16, by the resistance of the blank when the blade 242 strikes the flange 59a. In order to assure that the blade 242 will be medially located with respect to the length of the flange, the platform 27 may be provided with a series of holes 243 in the medial longitudinal line through the platform, in one of which a suitable taper pin, not shown, may be selectively placed according to the length of blank being produced, to act as a stop therefor.

Figure 15:
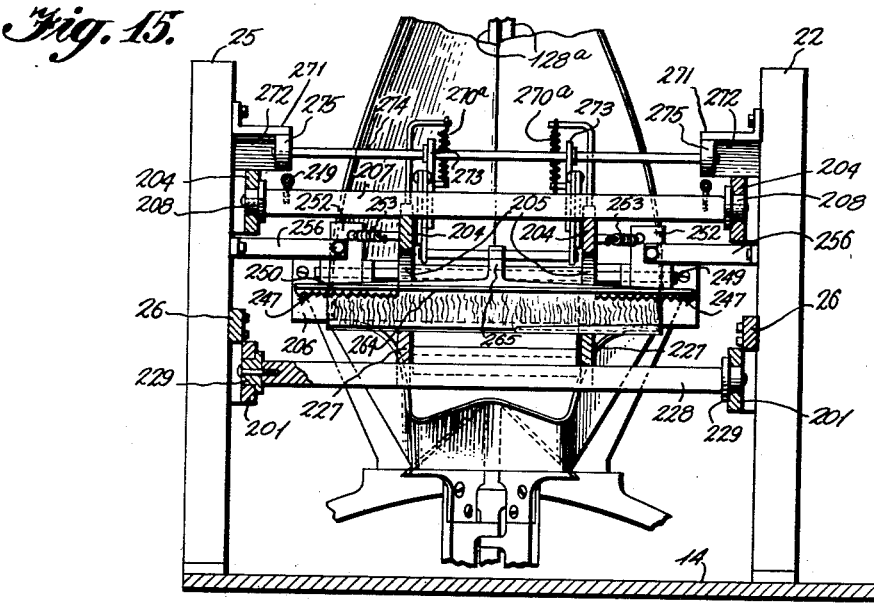
Figure 15 is a section taken along the line 15—15 of Figure 14.

Referring again to the upper carriage 203, the press plate 206 is longer than the length of the prolongation 198 of the bag selected for purpose of illustration, as shown in Figures 15 to 17, excess length being provided so that the pressure plate can take care of bags of great valve depth, the depth of the valve being of course, one-half the length of the prolongation. The blade is of less length than the press plate, its length as shown being confined to the distance between the longitudinal bars 227. The press plate 206 has a longitudinal rabbet 244, extending its full length on its inner side, opening along the bottom. The upper wall of this rabbet in the middle for a length equal to the length of the blade 242 is horizontal, as shown at 245 in Figure 16. Said upper wall from the ends of said horizontal portion to the ends of the press plate is upwardly inclined toward the inner face of the press plate, as shown at 246 in Figure 14. These inclined portions permit the incursion of grippers 247 into the rabbet, the grippers being spaced apart a distance equal to at least the length of the horizontal portion 245 of said upper wall. The grippers each consist of a rocking lever 248 journaled on a shaft 249, mounted in spaced brackets 250 secured to the press plate above the rabbet. The lower arm of the rocking lever terminates in a long jaw 251, preferably coextensive in length with the corresponding portion of the rabbet having the inclined upper wall, said jaw having a serrated free edge, Figure 15, that moves into the rabbet immediately below said upper wall when the gripper is operated to close against a sleeve blank held in the rabbet. The grippers 247 are biased in a closing direction by springs 253 tensioned between the upper arms 252 of the rocking lever 248 and posts 254 which stick out laterally from the outer sides of the parallel bars 204 of the upper carriage. The grippers are simultaneously opened by contact of their upper arms 252 with the fixed adjusting screws 255, when the carriage 203 reaches its limit of inward movement. The adjusting screws are mounted on angular metal straps 256, which are secured to the sides of the vertical posts 22 and 25.

When the lower carriage moves out from the position shown in Figure 16, the blade 242 engages the sleeve blank flange 59a at a point slightly lower than the corner fold line, carrying the sleeve blank with it. As the forward movement progresses, the blank is pulled off from the platform and its rear end drops upon the parallel bars 204 of the carriage, the blank assuming a position downwardly inclined toward the rear with its flange at right angles to its downwardly inclined face. This position is not shown, but is an intermediate stage between the position of the blank shown in the middle of Figure 16 and the position shown in Figure 14. Just as the lower and upper carriages have about reached their respective foremost and rearmost positions, the edge of the flange 59a contacts the rear wall of the rabbet 244, diverting the flange downwardly at an acute angle to the inclined face of the blank; the blade 242 meets the resistance of the press plate, rocking the pawl 239 clockwise, as viewed in Figure 14; the blade slides up the inner face of the flange 59a into the corner at the fold line, and pushes the apex of the fold line upward until it contacts the horizontal middle portion of the upper wall of the rabbet. In the meantime, the upper arms 252 of the grippers have contacted the screws 255 and opened the grippers to admit the apex of the fold between the grippers 251 and the back wall of the rabbet. The screws 255 must be nicely adjusted so that the jaws will open up just sufficiently to permit the apex of the fold to be pushed up frictionally between them and the back wall of the rabbet, and grippers are so dimensioned that their serrated edges grip the apex of the acute angled fold above both paste lines. The tension of the springs 253 is such as to provide a clamping pressure not much more than is adequate to hold the blank.

The upper carriage is now ready to advance toward the bag, taking with it the blank, and the lower carriage is ready to return to the position shown in Figure 16 to pick up another blank. The moment the upper carriage starts to move forward, the upper arms 252 of the grippers part company with the screws 255, which causes the serrated edges of the grippers 250 to close against the apex of the fold of the flange 59a. At the same time the initial rearward movement of the lower carriage will cause the blade 242 to withdraw from the dihedral angle between the flange 59a and the face of the blank. There will be a point in the recessive movement of the lower carriage at which it will slide from under the rear end of the gripped blank, leaving it unsupported so that the face portion will drop and hang suspended by the grippers in a position indicated by the broken line X in Figure 16. The stiffness of the paper will, however, keep the dihedral angle open for it is gripped extremely close to its apex.

As the upper carriage approaches the bag, it is essential that the press plate 206 must clear the short edges 199 of the prolongation 198, which Figure 14 shows are extending out horizontally toward the press plate, for the latter must pass to the rear of these edges and the prolongation must rise up in front of it. Since different bags are designed to have valves of different depth, the prolongation 198 will not always be of the same length, so that the short edges 199 will not always be at the same level, therefore, before attempting a production run of the machine, a specimen of the bag to be valved must be set up in the indexing drum, as shown in Figure 14, and an adjustment made to cause the press plate to just clear said short edges. The means for making this adjustment are the jack screws 15, casually referred to in an early part of this specification, which support the bed plate 14 at its corners and by means of which the level of the bed plate can be adjusted. The jack screws have collars 257 which rest upon the upper flanges of the channel beams 12 and 13, Figure 21. Said jack screws have cylindrical lower portions journaled in vertical bearings in said flanges and extending therebelow. They have similar sprockets 258 on their lower portions, commonly encompassed by a chain 259. The jack screws are rotated by a hand crank 260 through a bevel gear set 261 connected between said crank and one of said jack screws. The transfer unit including the platform 27 is mounted on said bed plate, and since the level relationship of the traverse of the blanks to the platform must be maintained, the roller supporting frames 216 and 217 are also mounted on the bed plate subject to adjustments of the level thereof. By turning the hand crank to raise or lower the bed plate, as the case may require, the operator can bring the lower surface of the press plate to a level in which it will clear the short edges 199. Since the main driving chain 96, Figure 1, bridges the adjustably variable space between the main frame and the bed plate 14, means is provided for compensatingly adjustably varying the effective length of the driving chain. This means comprises the tumble bar 329 pivotally mounted at its center on the front of the channel beam 12 by a stud bolt 330, which may be tightened to immobilize the tumble bar. Each end of the tumble bar carries an idler sprocket 331 between which the chain passes to opposite sides of said sprockets. Before operating the jack screws, the tumble bar is loosened to permit the chain to become slack. After the bed plate has been adjusted to the desired level, the tumble plate is oscillated to properly tension the chain, and the stud bolt tightened.

Referring once again to the upper carriage, particularly as illustrated in Figures 14, 15, 16 and 17, the forward face of the press plate 206 is provided with a tube spreader 262 in the form of a wide angled wedge, wide in a horizontal direction and thin in a vertical direction. It is shown as being coextensive in length with the press plate, but may be of any desired length. Its apex or nose is in the medial longitudinal plane of the carriage and it is positioned above the level of the rabbet. Its function is to spread apart the opposite sides of the mouth of the bag immediately above the prolongation 198, and by so doing, to tension the three sides of said prolongation, Figure 30, so as to straighten it and thereby lift it and bring it into proper position in front of the flange of the sleeve blank to permit the two to be pasted together. The tube spreader works within a limited area, for it will be recalled that the bag is constricted by the clamping arms 128a just back of the valve, as shown in Figures 14, 16 and 17, so that displacement of the sides of the bag mouth is limited to those parts forward of the clamping arm, and concentrated upon said prolongation.

As the upper carriage moves forward, it passes over the short edges 199 until it contacts the opposite edges of the mouth of the bag immediately above said short edges. Said opposite edges are already standing some distance apart, as seen in Figure 30, due to the spreading action of the open hinge blades 174 which have spread the gusset. Therefore, while the nose of the tube spreader, which is in advance of the press plate will have entered some distance within the bag mouth when the press plate makes contact with the side edges of said mouth, said tube spreader will not yet be in contact with said side edges. As the press plate moves in further, pushing with it the side edges which it contacts, said tube spreader will engage the inner sides of the bag adjacent its mouth, and due to the wide angularity of the tube spreader, it will quickly spread said sides at a wide angle, as shown at 263 in Figure 17. The effect of this is to raise the level of the free edge of the prolongation substantially to the height of the fold line between the flange 59a and the face portion of the sleeve blank, and to tension said prolongation into a planiform condition with rectilinear free edge, within the dihedral angle between said flange and face portion, and between the paste lines.

The upper carriage 203 is provided with a presser foot 264 of a length coextensive with that of the press plate, rigidly mounted at intermediate points upon the ends of similar bell crank levers 265 which are journaled adjacent the parallel bars 204 on the same shaft 249 as the grippers, said shaft bridging the space between said parallel bars. The bell crank levers are so bent that the working of the presser foot is parallel to the back wall of the rabbet of the press plate, and in clamping relation thereto, when in closed or pressing position. Each bell crank lever is operated by a toggle comprising a link 266 pivotally connected at one end to the bell crank lever at an intermediate point 267, and a link 268 pivotally connected at its remote end to one of the bars 204 at 269. The adjacent ends of said links are mutually pivotally connected at 270.

The toggles are biased to cause them to assume a contracted position by springs 270a attached to the links 268. In this position the levers 265 are pulled up to cause the presser foot 264 to assume the inactive position shown in Figure 14, in which it is above the level of the path of movement of the blade 242 of the lower carriage carrying the sleeve blank. The toggles are expanded by the following mechanism. A pair of similar plates 271 are secured to the opposite forward posts 22 and 25 at a level above the upper carriage in similar spaced side by side relation and extending parallel to the direction of movement of the carriage. The under surfaces of these plates are similar cam tracks 272 which incline downwardly in a forward direction. Each of the links 268 has an upstanding lug 273 fixed thereto, said lugs being similarly placed transversely, and having transversely aligned holes through which a rod 274 extends. This rod is of such length that its ends underlie the cam tracks 272, there being rollers 275 journaled on said ends engaging said cam tracks. The springs 270a are anchored between posts 276 extending inwardly from the links 268 and the inwardly overhanging ends of vertical posts 277 which are fixed to the parallel bars 204 of the carriage. Said springs thus avoid structural interference with the toggle linkage, and are axially vertical. When the rollers 275 are against the high ends of the cam tracks 272 the toggles are contracted by the springs. As the rollers travel downwardly along the cam tracks with the forward movement of the carriage, the toggles are expanded and the bell crank levers 265 rotated to bring the presser foot into clamping relation to the back wall of the press plate 206, this relation of parts being shown in Figure 16.

It has been explained that as the upper carriage is just about to reach its forward limit position the tube spreader 262 has spread the bag mouth and brought the prolongation 198 of the bag up within the dihedral angle between the flange 59a and the face portion of the sleeve blank, and between the paste lines on the sleeve blank. Now, at the limit of forward movement of the carriage the presser foot comes into play and squeezes the prolongation between the sides of the dihedral angle, mashing the lines of paste into a thin film and pasting said prolongation in place. The final movement of the presser foot into pressing position, and its release movement are quite rapid, since the forward part of the cam track 272 dips at an abrupt angle with respect to the rest of the cam track.

At the start of the return movement of the upper carriage, the tube spreader retreats from the bag mouth, releasing the tension upon the sides of the bag, permitting it to be pulled out by the presser foot until the short edges 199 reassume the horizontal position shown in Figure 14. As the upper carriage continues to retreat, the sleeve blank is pulled away from the closed grippers 247 and stays with the bag, for while the pasted surfaces are still wet, inherent atmospheric pressure on both of the pasted interfaces holds the sleeve blank firmly in adhered position. But this time the edge of the prolongation does not revert to the rectangular form shown in Figure 30, for it has been stiffened by the overfolded and pasted portions of the sleeve blank. However, the weight of the sleeve blank causes the lip formed by the united portions of the sleeve blank and the prolongation to sag in a wide arc between the spaced short sides of the prolongation. At this time the planiform portion of the gusset forward of the fold line 161 inclines upwardly and forwardly to said lip, incipient fold lines being created extending from the ends of the fold line 161 to the bases of the short sides 199. The depending portion of the sleeve blank now lies against said planiform portion, which latter, as has been stated, has the predilection to fold together, since it is medially longitudinally intersected by the gusset crease.

The conditioning of the mouth portion of the bag so as to receive the sleeve blank, the placing of the sleeve blank over the prolongation 198, the pressing operation and the retreat of the upper carriage to the point at which it parts company with the sleeve blank, all take place while the blank is stopped at the vertical dwell of the indexing drum.

The bag and the united sleeve blank, with the parts disposed as last described, is now carried by the indexing drum to the creasing station at which the valve is formed and the sleeve simultaneously infolded in situ in the valve.

Referring to Figure 3, it will be recalled that it is the semicylindrical cam 190 that holds the hinge blades open, and that at the dwell point of the indexing drum forty-five degrees beyond its vertical dwell there is a recessible portion 197 of said cam, including a corresponding part of the cam surface against which the roller 194 travels. The purpose of this recessible portion is twofold; first, to permit the hinge blades to close as it recedes, leaving the gusset free to contract, which it must do incidental to the infolding of the valve; and second, immediately thereafter to reopen said hinge blade to spread the newly formed valve somewhat to permit the unimpeded egress of the creasing means from between the sides of the valve.

Referring to Figures 1, 3, 4, 8 and 17, the recessible part 197 is at the end of a bar 278 which passes slidably through channeled guide plates 279 mounted on the tops of the upper flanges of the channel beams 12 and 13 of the main frame. A cam shaft 280 is mounted forwardly of the channel beam 12, journaled in bearings 281, carried by brackets 282, secured to the beam 12 with provisions of vertical adjustment, the slot and bolt connections 283 shown in Figure 1. The cam shaft 280 is beneath the cam shaft 209 shown in Figure 17. The last named cam shaft has a sprocket 284 above a sprocket 285 on the cam shaft 280 and drives the latter cam shaft through a chain about both sprockets. Since the level of the cam shaft 209 varies with the adjustment of the bed plate 14, vertical adjustment of the brackets 282 is necessary to effect corresponding variation in level of the cam shaft 280.

A cam 286 is on the cam shaft 280, engaged by the end of the bar 278 under the bias of a spring 287 anchored under tension to said rod and to the beam 12. This cam is so angularly displaced as first to cause the recessible part 197 to move in under the urge of the cam, and then pushes it back into its normal position, restoring the continuity of the cam surface of the cam 190. All of this takes place while the bag is at the forty-five degree dwell position of the indexing drum. All this while the roller 194 is resting against the cam surface of the recessible part, so that the roller first moves in, causing the hinge blades to close, then moves out, opening them.

The movement of the hinge blades at this point is correlated with the operation of a creaser 288 which includes a bell crank lever and a thin blade 290, which blade gives a smart blow to the sleeve blank and the underlying portion of the bag along the longitudinal medial line of these parts, simultaneously infolding the valve and reentrantly creasing the sleeve blank, forcing said sleeve blank down between the sides of the valve until the dihedral apex of the creased sleeve is substantially coincident to the apex of the infolded valve. It will be recalled that the portion of the bag underlying the sleeve already has the tendency to fold inwardly, since the medial crease of the gusset extends longitudinally through the middle of this portion, so that this tendency of the valve to infold assists the creaser in creasing the sleeve blank. The hinge blades close progressively during the creasing operation. The infolding of the valve develops an external pleat in the trough of the gusset, due to the breaking of the fold line 161 at its middle point, which pleat disposes itself between the closing hinge blades which are designedly spaced apart when closed, for the purpose of receiving said pleat. Immediately upon the completion of the creasing operation the hinge blades open, spreading the valve to permit the free egress of the blade 290.

The valving and sleeve creasing operations are now complete. When the indexing drum again starts to rotate, the roller 194 reaches the end of the cam, drops off the recessible portion 197, and permits the blade to close so that the valve and sleeve are free to come together in substantially flat relation.

Since the creasing operation is performed while the bag is held at a forty-five degree angle, the creaser must operate in a plane that is forty-five degrees slanted with respect to a horizontal datum. Therefore, the bar 291 is provided with a block 295 at the end adjacent the indexing drum, having a face 296 in a forty-five degree plane, to which face the bell crank lever of the creaser is intermediately pivoted at 297. The lower end of the bell crank lever is pivotally connected to a link 298, which in turn is pivotally connected to the channel beam 13, the link lying in the same plane as the creaser.

Shortly before horizontal position is reached, the clamping arms 128a open and the bag is in released relation to the indexing drum, ready to be discharged therefrom.

The bags are automatically removed from the indexing drum by means of a continuously moving endless conveyor 299. This is shown in plan in Figure 3. It is back of the main frame at the side of the indexing drum on the discharge side, and it interdigitates with the indexing drum so as to underlie the finished bag on the indexing drum at the discharge station.

The conveyor frame comprises two similar spaced parallel channel beams 300, shown in end view in Figure 4, supported by a pair of transversely spaced rear legs 301, Figures 2, 4 and 18, and a corresponding pair of intermediate legs 302. The forward portion of the channel beams project in cantilever relationship to the base of support defined by the supporting legs. The conveyor flights are endless chains 303, having outwardly projecting dogs 304 at short intervals. The flights are carried by sprockets 305 and 306, the forward sprockets 305 being journaled on stub shafts 307 mounted at the forward ends of the channel beams 300, and the rear sprockets 306 being fixed to a shaft 308 which is journaled in the channel beams, and by which shaft the conveyor flights are driven.

The forward part of the conveyor has no cross member, since the clamping arms 128a must pass between the flights. Figure 2 shows that the conveyor is at such level that the dogs 304, when in horizontal traverse, intersect the plane occupied by the bag at the discharge station, and that the forward sprockets are beyond the adjacent flat 122, which defines the position of the trailing side of the bag. Therefore, as the dogs ascend the sprockets, corresponding dogs on each chain make contact with the trailing side of the bag and remove it from the indexing drum. It is eventually delivered from the rear end of the conveyor into a suitable receptacle, not shown, which would be behind the roll of paper stock for the sleeve blanks, or it may be dropped direct upon the floor.

The drive for the conveyor will now be traced. It begins with the shaft 150, Figure 4, which comes out of the reduction gear box 11. This shaft carries a sprocket 309, chain connected to a sprocket 310, Figures 3 and 5, on a first lay shaft 311 which bridges the main frame and is journaled in the channel beams 12 and 13. This lay shaft carries a sprocket 312 chain connected to a sprocket 313 on a second lay shaft 314, also journaled in the channel beams 12 and 13, but extending beyond the channel beam 13, the extending end having a gear 315. This gear meshes with a gear 316 on the extended end of a shaft 317 which is journaled in the channel beams 300 and in a bearing 318 mounted in a block 319 fixed within the channel beam 13. The main purpose of the gears 315 and 316 is to change the direction of the drive, it being essential that the shaft 317 rotate clockwise, as viewed in Figure 3, to drive the conveyor in the direction of the arrow, that is, away from the indexing drum. The shaft 317 has a sprocket 320, chain connected to a sprocket 321 on the shaft 308.

It can readily be deduced from the position of the bag indicated in broken lines at the left in Figure 3, that when this bag reaches the discharge station, the entire valve and sleeve structure will overhang the adjacent flight of the conveyor. It is desirable to press the valve and sleeve flat. For this purpose a pressing roll 322 is fixed to that portion of the shaft 317 supported between the adjacent channel beams 300 and 13. Directly above the roll 322 and spaced therefrom, a distance equal to the thickness of the flattened valve and sleeve structure, is a complementary roll 323 mounted on a stub shaft 324 journaled in a bearing 325, also carried by the block 319. The stub shaft 324 is driven by a gear 326 on said stub shaft, which meshes with the gear 316. The rolls 322 and 323 are driven at the same linear speed as the conveyor. The space between the rolls is in the plane of a bag traveling on the conveyor so that the valved area of the bag is entrained between the rolls and creased flat.

While I have in the above description disclosed a practical embodiment of the invention, it will be understood by those skilled in the art that the details of construction and arrangement of parts are subject to modification and the substitution of equivalents, so that the specific machine disclosed is to be regarded as illustrating the principles of the invention and not as necessarily limiting its scope.

What I claim is:

1. Apparatus for incorporating sleeved valves in bags, comprising an indexing drum on a horizontal axis, including a series of equally spaced diametrically opposite radiating pairs of cooperating clamping arms at each end of said drum, said series being spaced apart in parallel planes a distance less than the length of a bag, means for driving said drum step by step with dwells between each step, the significant dwells being a loading station and a discharging station at opposite sides of said drum in a horizontal axial plane, a vertical sleeve inserting station above said horizontal plane and a valve forming and sleeve blank creasing station between said inserting station and discharge station, corresponding pairs of clamping arms being open when at said loading and discharge stations whereby a bag may be freely slipped between them and freely removed, means actuated through rotation of said drum for holding said clamping arms clamped against a bag from a point adjacent said loading station to a point beyond said valve forming and sleeve blank creasing station, gusset spreading means carried by said indexing drum at one end, duplicated for each pair of clamping arms at said end, coacting with the gusset at one side of the bag forward of said last named clamping arms for spreading the gusset and holding the adjacent portion of the bag mouth spread forming a transverse lip, at said inserting station, a horizontal platform having an edge thereof confronting said indexing drum in proximity thereto at said inserting station, means for depositing a sleeve blank with down-folded marginal flange and a line of paste on the inner side of said flange, upon said platform with said flange and paste line overhanging said edge, means engageable with said flange movable therewith toward said indexing drum for transferring said blank from said platform to a position with its flange rearward of said lip, means for spreading the mouth of said bag above said lip to tauten said lip in front of said flange, and means for pressing said flange and lip together with the paste line intervening.

2. Apparatus for incorporating sleeved valves in bags as claimed in claim 1, including means operative at said valve forming and sleeve blank creasing station for contracting said gusset spreading means, and means at said valve forming and sleeve blank creasing station operative during the contraction of said gusset spreading means to re-entrantly crease said sleeve blank along its medial longitudinal line and simultaneously infold the underlying portion of said bag about said sleeve blank.

3. In apparatus for incorporating sleeved valves in bags, a sleeve blank forming unit comprising a frame, means on said frame for journally supporting a coil of strip sleeve blank material, said frame including a horizontal bed plate, a longitudinal series of pairs of upper and lower driven rolls on parallel axes carried by said bed plate, the lines of substantial tangency of the rolls of said pairs defining a path of progress of sleeve blank material through said series of rolls, the anterior pair frictionally contacting between them a portion of said strip continuous with said coil for feeding it between the second pair, the latter being out of feeding contact with said strip and having a projecting knife on one registerable with a complementary groove on the other for severing a blank at each revolution of said rolls, the third pair having its point of tangency within a blank's length of the severing point of the second pair, having upper and lower portions in feeding contact with the blank for drawing it away from the second pair and having slightly spaced paste applying disks on its lower roll, an underlying paste pot in which said disks dip whereby spaced parallel lines of paste are applied to the sleeve blank, the lines of tangency of the third and fourth pairs of rolls being spaced within a blank's length, the fourth pair having upper and lower portions in feeding contact with the blank, the upper roll having a flange at one end overlapping the adjacent end of the lower roll for folding down a flange at one side of the blank, the lapping ends of said rolls being so positioned that the line of fold of the flange is intermediate said paste lines, a platform posterior to the fourth pair of rolls and at a lower level than their line of tangency upon which platform said flanged blank is deposited by said fourth pair, said platform being so positioned that the flange and paste lines of said blank overhang the adjacent longitudinal edge of said platform, an indexing drum for presenting bags successively in confronting position to the said edge of said platform, each with the lower part of its mouth spread forming a transverse lip, means for transferring said blank from said platform to a position in which the lip of a bag so presented is within the dihedral angle formed by the fold of said flange, means for tautening said lip in front of said flange and between said paste lines, and means for pressing said blank against opposite sides of said lip into adherence therewith.

4. In apparatus for incorporating sleeved valves in bags, a sleeve blank forming unit comprising a frame, means on said frame for journally supporting a coil of strip sleeve blank material, said frame including a horizontal bed plate, a longitudinal series of pairs of upper and lower driven rolls on parallel axes carried by said bed plate, the lines of substantial tangency of the rolls of said pairs defining a path of progress of sleeve blank material through said series of rolls, the anterior pair frictionally contacting between them a portion of said strip continuous with said coil for feeding it between the second pair, the latter being out of feeding contact with said strip and having a projecting knife on one registerable with a complementary groove on the other for severing a blank at each revolution of said rolls, the third pair having upper and lower feeding portions whose point of tangency is a blank's length from the severing point of said second pair for drawing the blank away from the second pair, and having other cooperating upper and lower portions with a transversely inclined projecting blade on the one interleaving with the complementary inclined groove on the other for folding an ear on the blank, said third pair also having slightly spaced paste applying disks on its lower roll, an underlying paste pot in which said disks dip whereby spaced parallel lines of paste are applied to the sleeve blank, the lines of tangency of the third and fourth pairs of rolls being spaced within a blank's length, the fourth pair having upper and lower portions in feeding contact with the blank, the upper roll having a flange at one end overlapping the adjacent end of the lower roll for folding down a flange at one side of the blank, the lapping ends of said rolls being so positioned that the line of fold of the flange is intermediate said paste lines, a platform posterior to the fourth pair of rolls and at a lower level than their line of tangency upon which platform said flanged blank is deposited by said fourth pair, said platform being so positioned that the flange and paste lines of said blank overhang the adjacent longitudinal edge of said platform, an indexing drum for presenting bags successively in confronting position to the said edge of said platform with the lower end of its mouth spread to form a transverse lip, means for transferring said blank from said platform to a position in which the lip of a bag so presented is within the dihedral angle formed by the fold of said flange, means for tautening said lip in front of said flange and between said paste lines, and means for pressing said blank against opposite sides of said lip into adherence therewith.

5. In apparatus for incorporating sleeved valves in bags the subcombination which comprises a main frame, means at an end of said frame for journally supporting a coil of strip sleeve blank material, said main frame including a horizontal bed plate, anterior and posterior roll supporting frames mounted on said bed plate, said posterior frame being fixed, said anterior frame being adjustably slidable thereupon toward said posterior frame, a longitudinal series of pairs of upper and lower driven rolls on parallel axes carried by said roll supporting frames, the lines of substantial tangency of said rolls defining the path of progress of the sleeve blank material through said series, the latter including feeding and severing pairs of rolls carried by said anterior frame, the feeding pair contacting between them a portion of strip material continuous with said coil for feeding it between the severing rolls, the latter being out of feeding contact with said strip and having a projecting knife on one registerable with a complementary groove on the other for severing a blank at each revolution of said rolls, the subsequent rolls of said series being carried by said posterior frame, including in order an ear forming and paste applying pair and a flange forming pair, the rolls of said ear forming and paste applying pair comprising axially displaced disks including medial feeding disks for drawing blanks from said severing rolls, ear forming disks at one side of said medial disks having a circumferential length twice the maximum length of blank handled by the apparatus, the upper of said ear forming disks having blades at diametrically opposite positions, inclined transversely in the same direction, cooperating with complementary open sided slots on the lower disk, cooperating pasting disks at the opposite sides of said medial disks each having a pair of spaced circumferential flanges in offset relation, a flange of the upper disk tracking between the flanges of the lower disk, a paste pot underlying the lower disk into which the flanges of the lower disk dip for applying spaced lines of paste to the under side of a sleeve blank passing between said flanged disks, said flange folding pair of rolls having upper and lower portions in feeding contact with the blank, the upper roll having a flange at one end overlapping the adjacent end of the lower roll for folding down a flange at one side of the blank, the lapping ends of said rolls being so positioned that the line of fold of the flange is intermediate said paste lines, a platform posterior to the flange folding rolls and at a lower level than the line of tangency, upon which platform said flanged blank is deposited by said flange folding rolls, said platform being so positioned that the flange and paste lines of said blank overhang the adjacent longitudinal edge of said platform, means for driving said severing rolls, ear forming and pasting rolls, and flange forming rolls at the same linear speed, means for selectively changing the linear speed of the feeding rolls on the anterior frame to vary the length of the severed blanks, and means for adjustably changing the phase of displacement of the ear forming rolls with respect to their drive whereby they may be set to begin the folding of the ear at the middle point in the length of a blank of any length.

6. In apparatus for incorporating sleeved valves in bags, means for forming successive sleeve blanks with a down folded flange on one side and lines of paste on the under surface at opposite sides of the fold line of the flange, means for delivering said blanks successively to a transfer station, means for presenting bags successively in confronting relation to said transfer station in vertical position with their mouths toward said station, means for clamping said bags flat transversely, to define between the mouth of a bag and said clamping means a zone of a width slightly greater than the depth of the valve to be formed, means for spreading the lower end of the mouth of the bag to form a transverse lip, transfer means for conveying said blank from said transfer station to said bag, comprising a pair of carriages reciprocable in opposite phase, one having an elongated press plate, grippers cooperating with said press plate, a presser foot cooperating with said press plate and a bag mouth spreader ahead of said press plate, fixed means contacted by said grippers at the limit of inward movement of said first named carriage for opening said grippers, the other carriage having means for engaging the inner side of the flange of a blank at said transfer station, said flange engaging means at the outward limit of travel of said other carriage engaging said press plate at the inner limit of travel of the first named carriage, positioning the line of fold of the blank within range of the grippers, the latter clamping said blank close to the line of fold on the initial outward movement of the said one carriage, said first named carriage being movable outward to a point at which said presser plate and flange blank are on the inside of the lip of the bag prior to the operation of said valve mouth spreader, the latter upon further forward movement of said first named carriage spreading the mouth of said bag anterior to said clamping means for tautening said lip in front of said flange, and means for operating said presser foot to clamp said sleeve blank including said paste lines against both sides of said lip while the latter is in tautened position.

7. In apparatus for incorporating sleeved valves in bags, an indexing drum comprising a horizontal shaft, wheel-like members on said shaft each having an exterior peripheral series of uniformly spaced flats at diametrically opposite positions, said flats of both series being correspondingly circumferentially displaced, a pair of clamping means for each flat having a dovetail slide and guide connection therewith, said clamping means of each corresponding transverse pair having cooperating clamping arms positioned to hold a bag flat in an axial radial plane, one of said clamping means of a pair being adjustably fixed, the other being slidable, means for driving said indexing drum step by step, the angular amplitude of said steps being the angle between adjacent of said axial planes, there being a dwell between each step, significant dwells occurring at horizontal and vertical planes, a fixed cam coaxial with said shaft, link and lever means between said cam and said slidable clamp means engageable by said cam for moving said slidable clamp means to clamping position with respect to said adjustably fixed clamp means, a spring for returning said slidable clamp means to release position, said cam being shaped to maintain said clamp means closed during that part of the upper arc of movement of said indexing drum which begins and ends above the horizontal axial plane, a horizontal platform adjacent one of said wheel-like members for supporting a sleeve blank, said platform being above said shaft and intersected by the vertical axial plane of said shaft, said last mentioned wheel-like member having gusset spreader supports fixed to its inner periphery inwardly of said flats and extending radially inwardly, a pair of cooperating hinged gusset spreaders mounted on each support, having mutually convergent spreader blades symmetrical with the axial radial plane between corresponding clamping arms for spreading the lower gusset of the bag adjacent its mouth, a fixed spreader operating cam, means actuated by said cam for operating said spreaders, springs for closing said spreaders when released by said spreader operating cam, the latter being shaped and positioned to hold said spreaders open from a point in the upper arc movement of said indexing drum anterior to said vertical axial plane subsequent to the closing of said clamping arms, to a point beyond said vertical axial plane anterior to the point at which said clamping arms reopen.

8. Apparatus for incorporating sleeved valves in bags, as claimed in claim 7, including means for adjustably varying the level of said platform.

9. Apparatus for incorporating sleeved valves in bags comprising an indexing drum on a horizontal axis having transversely spaced pairs of clamping means diametrically opposite in uniformly displaced axial planes, means for driving said indexing drum step by step with a dwell between each step, significant dwell positions being a loading station and a discharging station at the opposite sides of said drum with the clamping arms in a horizontal plane, a sleeve blank inserting station with the clamping arms vertical above said horizontal plane, and a valve forming and sleeve blank creasing station between said inserting station and discharging station with the clamping arms inclined, said arms being adapted to hold bags flat with the mouth end toward one end of said indexing drum and the mouth end to be valved toward the axis of said drum, the clamping means at said end, when clamped, constricting the bag transversely, defining a zone between said mouth and said clamping means slightly wider than the depth of the valve to be formed, a horizontal platform adjacent said end above the axis of said drum intersected by the vertical axial plane for receiving a sleeve blank with downfolded flange and wet paste on the under side of said flange, means for successively spreading the lower ends of the mouths of the bags forming each with a transverse lip carried by said drum, at said end adjacent said clamping arms, each including a pair of blades hinged on a radial axis for spreading the lower gusset of the corresponding bag, a cam having a cam face coaxial with said drum and above the horizontal axial plane, means including an element engageable with said cam in the rotation of said drum connected to said spreading means, said cam face being shaped to open said spreading means at a point anterior to said sleeve inserting station and holding it open until the corresponding bag reaches said valve forming and sleeve blank creasing station, means for transferring said sleeve blank from said platform to the spread mouth of the bag at said inserting station and pasting said flange to said lip, said cam face having a recessible portion contacted by said cam engaging element when said bag with inserted sleeve blank is at said valve forming and sleeve blank creasing station, means timed to successively retract and advance said recessible portion while engaged by said element, to cause said spreading means to close and reopen, a creasing blade at said creasing station engageable with said sleeve blank to re-entrantly crease it along its longitudinal medial line, and simultaneously infolding the mouth portion of the bag bounded by said lip to form a valve about said creased sleeve blank, means for operating said creasing blade synchronously with the operation of said recessible portion to perform its infolding and creasing function as said spreading means closes, and to withdraw it as said spreading means opens.

10. In apparatus for incorporating sleeved valves in bags, an indexing drum on a horizontal axis having a series of clamping means at diametrically opposite points for holding bags flat in radial planes with their mouth ends projecting beyond said clamping means toward one end of said drum, means for driving said drum step by step to bring the successive bags successively to a sleeve blank inserting station and to a valve forming and sleeve blank creasing station, spreading means carried by the said end of said drum individual to each bag position on the drum for successively spreading the mouths of said bags forming a transverse lower lip and holding them spread from a point anterior to said inserting station, to said valve forming and sleeve blank creasing station, each spreading means comprising a support secured to said drum having a lug projecting beyond said end of said drum, an axially radial hinge pintle mounted in said lug, a pair of hinge leaves mutually swingable together and apart mounted on said pintle and having gusset engaging blades at their radially outward ends, mutually convergent, a guideway parallel to the axis of said drum at the radially inward end of said support, a bar slidable in said guideway having a cam engaging roller at one end, a post on said bar playing in a slot in said support, links pivoted to said post and to the respective hinge leaves, a cam having its cam face in the upper arc of the circular path of movement of said roller, with a depression at the anterior end of said cam face, a spring anchored under tension to said bar and to said support for urging the roller against said cam face, said slot limiting the camward excursion of said bar and roller.

11. Apparatus for incorporating sleeved valves in bags, as claimed in claim 10, said cam face having a recessible portion positioned where it will be contacted by said roller when the corresponding spreading means is at the valve forming and sleeve blank creasing station, and means timed to retrace and advance said recessible portion while it is engaged by said roller.

12. In apparatus for incorporating sleeved valves in bags comprising in combination, a substantially horizontal platform for supporting a sleeve blank having a downfolded flange at one side with spaced lines of paste on the under surface parallel to the line of fold of said flange and on opposite sides of said line of fold, said flange including the lines of paste overhanging an edge of said platform substantially parallel thereto, means for supporting a bag with its mouth in confronting relation to said edge of the platform, constricted transversely in flat form at a distance from the bag mouth to define a zone between said mouth and the line of constriction slightly wider than the depth of the valve to be formed, and held in a vertical plane perpendicular to said edge of the platform, positioned with the lower end of its mouth spread forming a transverse lip, said lip being below the level of said platform, transfer means between said platform and said bag supporting means comprising a frame supporting said platform, said frame including spaced upper guideways at a level above said platform and spaced lower guideways at a level below said platform, said guideways being perpendicular to the said edge of said platform, upper and lower carriages tracking in the respective upper and lower guideways, means for simultaneously reciprocating said carriages in opposite phase, the forward end of the lower carriage at its outer limit of movement and the forward end of the upper carriage at its inner limit of movement being cooperably adjacent, and beyond the outer end of said frame, with the upper carriage overhanging the lower carriage, a transverse press plate at the forward end of the upper carriage longer than the width of the spread lip having a longitudinal rabbet on its inner side opening in the forward face of said press plate, the rabbet portion of said press plate being intersected by the level plane of said platform, the top wall of said rabbet being in a horizontal plane in its middle portion and inclining upwardly at both sides of said middle portion, a bag mouth spreader in the form of a horizontal wide angled wedge projecting from the forward face of said press plate above said rabbet, a transversely pivoted pawl at the forward end of said lower carriage having a blade extending upwardly therefrom, not wider than the said middle portion of said top wall, said pawl being counterbalanced so as normally to maintain said blade in a forwardly inclined direction, and yieldable upon engagement with the flange of the blank to pass beneath said flange upon retrogressive movement of the lower carriage, said blade being the means to transfer said sleeve blank from said platform to said press plate by engagement with the inner side of said flange upon forward movement of said lower carriage, and being tiltable upon engagement with said press plate to raise the apex of the dihedral angle formed by the fold of said flange against the middle portion of said top wall, grippers mounted on said upper carriage laterally of the middle portion of said top wall, entering said rabbet close to the inclined top wall portions, means for closing said grippers upon the blank when seated against the middle portion of said top wall, close to the fold line thereof, said upper carriage on its forward movement positioning said press plate and flange back of said lip, said carriage upon further forward movement causing said mouth spreader to tauten said lip in front of said flange, and a presser foot carried by said upper carriage cooperating with said press plate for pressing the sides of said dihedral angle including the lines of paste against opposite sides of said lip.

References Cited in the file of this patent

UNITED STATES PATENTS

| Re. 23,486 | Lee | Apr. 29, 1952 |
| 2,483,860 | Uredenburg | Oct. 4, 1949 |
| 2,527,295 | Belcher et al. | Oct. 24, 1950 |
| 2,559,873 | Grupe et al. | July 10, 1951 |
| 2,643,588 | Burroughs | June 30, 1953 |